United States Patent
Groenendijk et al.

(10) Patent No.: US 10,135,698 B2
(45) Date of Patent: Nov. 20, 2018

(54) RESOURCE BUDGET DETERMINATION FOR COMMUNICATIONS NETWORK

(71) Applicant: Telefonaktiebolaget L M Ericsson (publ), Stockholm (SE)

(72) Inventors: Jan Groenendijk, Athlone (IE); Johan Christer Wilhelm Granath, Stockholm (SE); Yangcheng Huang, Athlone (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 265 days.

(21) Appl. No.: 14/890,968

(22) PCT Filed: May 14, 2013

(86) PCT No.: PCT/EP2013/059922
§ 371 (c)(1),
(2) Date: Nov. 13, 2015

(87) PCT Pub. No.: WO2014/183784
PCT Pub. Date: Nov. 20, 2014

(65) Prior Publication Data
US 2016/0087856 A1    Mar. 24, 2016

(51) Int. Cl.
*H04L 12/24* (2006.01)
*H04N 21/422* (2011.01)
*H04N 21/647* (2011.01)

(52) U.S. Cl.
CPC ...... *H04L 41/5009* (2013.01); *H04L 41/0631* (2013.01); *H04L 41/5035* (2013.01); *H04L 41/5038* (2013.01)

(58) Field of Classification Search
CPC ............. H04L 41/5038; H04L 41/5035; H04L 41/0631; H04L 41/5009
See application file for complete search history.

(56) References Cited

U.S. PATENT DOCUMENTS

| 5,751,964 A | 5/1998 | Ordanic et al. |
| 2002/0138638 A1 | 9/2002 | Hermann et al. |

(Continued)

FOREIGN PATENT DOCUMENTS

| WO | WO 2008/121062 A1 | 10/2008 |
| WO | WO 2012/055449 A1 | 5/2012 |

(Continued)

OTHER PUBLICATIONS

International Search Report for International application No. PCT/EP2013/059922, dated Apr. 9, 2014.

(Continued)

*Primary Examiner* — Redentor Pasia
*Assistant Examiner* — Peter K Mak
(74) *Attorney, Agent, or Firm* — Baker Botts, LLP

(57) ABSTRACT

Resources (10, 20, 30) of a communications network (40), are used to provide services, some are superordinate services (A, B) which depend on contributory services (C, D, E, F). Key performance indicators R-KPI are received based on measurements from the resources, of contributory services contributing to a corresponding key performance indicator KPI of the corresponding superordinate service. A selection (120) is made of the received R-KPIs which correspond to the normal operation of the superordinate service and a characteristic division is generated (130) of relative contributions of the R-KPIs to the KPI of the corresponding superordinate service for the times that the service was operating normally. This can be used as a basis for identifying differences with other R-KPIs to determine anomalies in behavior of contributory services for root cause analysis or in managing the network. Convergence evaluation and validation can be used to improve accuracy of the characteristic division.

16 Claims, 19 Drawing Sheets

(56) References Cited

U.S. PATENT DOCUMENTS

| | | | | |
|---|---|---|---|---|
| 2004/0039968 A1* | 2/2004 | Hatonen | ............... | G06K 9/6284 |
| | | | | 714/39 |
| 2010/0077077 A1* | 3/2010 | Devitt | ................... | H04L 41/147 |
| | | | | 709/224 |
| 2013/0083671 A1* | 4/2013 | Eskicioglu | .......... | H04L 43/0852 |
| | | | | 370/249 |

FOREIGN PATENT DOCUMENTS

| | | | | |
|---|---|---|---|---|
| WO | WO 2012055449 A1 * | 5/2012 | ........... | H04L 41/147 |
| WO | WO 2013/044974 A1 | 4/2013 | | |
| WO | WO 2014/005627 A1 | 1/2014 | | |

OTHER PUBLICATIONS

Ericsson's User Service Performance framework by Gerd Holm-Öste and Matz Norling, 2008.
Automated Adaptive Threshold Setting: Enabling Technology for Autonomy and Self-Management by David Breitgand et al., 2005.
Ericsson White Paper; Keeping the Customer Service Experience Promise, Jan. 2011.

* cited by examiner

WHEN GENERATING CHARACTERISTIC DIVISION FOR A1, THEN A1 IS THE DEPENDENT SERVICE AND B1, D1 AND E1 ARE CONTRIBUTORY SERVICES

WHEN GENERATING CHARACTERISTIC DIVISION FOR B1, THEN B1 IS DEPENDENT SERVICE AND C1 AND F1 ARE CONTRIBUTORY SERVICES

FIG 8

CHARACTERISTIC DIVISION

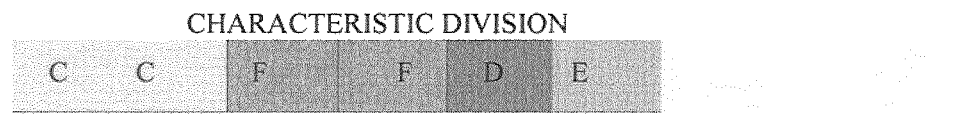

IS COMPARED TO FURTHER R-KPIs:

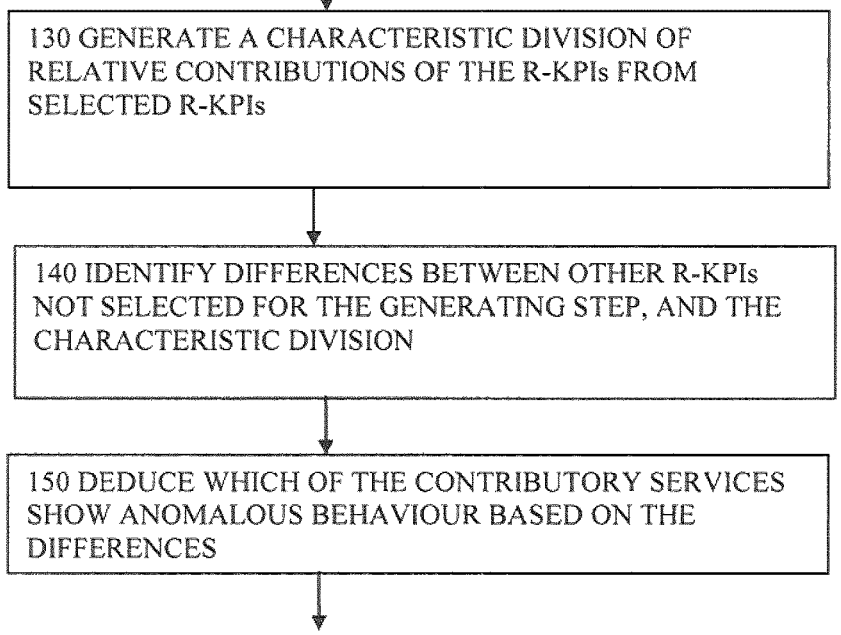

FIG 9

130 GENERATE A CHARACTERISTIC DIVISION OF RELATIVE CONTRIBUTIONS OF THE R-KPIs FROM SELECTED R-KPIs

140 IDENTIFY DIFFERENCES BETWEEN OTHER R-KPIs NOT SELECTED FOR THE GENERATING STEP, AND THE CHARACTERISTIC DIVISION

150 DEDUCE WHICH OF THE CONTRIBUTORY SERVICES SHOW ANOMALOUS BEHAVIOUR BASED ON THE DIFFERENCES

RESOURCE BUDGET DETERMINATION FOR COMMUNICATIONS NETWORK

PRIORITY

This non-provisional application is a U.S. National Stage Filing under 35 U.S.C. § 371 of International Patent Application Serial No. PCT/EP2013/059922, filed May 14, 2013, and entitled "Resource Budget Determination For Communications Network".

TECHNICAL FIELD

The present invention relates to methods of monitoring a communications network, to methods of analyzing behavior of services in a communications network, to corresponding apparatus and networks, and to corresponding computer programs.

BACKGROUND

One of the primary responsibilities of service providers is to ensure that their services provide a level of performance and robustness that satisfies the commitments specified in their service level agreements (SLAs) with customers, or satisfies internal targets. A known approach is to monitor the quality and behaviour of the services by measuring system-internal performance characteristics (such as round trip delay, available bandwidth and loss ratio), identify unusual or anomalous activity that either directly indicates or indirectly implies that the service is no longer behaving satisfactorily. These measurements allow for detection of quality degradation or functional loss. Additionally a service root cause analysis (RCA) function can be used to analyze (root) causes of service performance degradations, in order to identify the reason for a fault that resulted in the quality degradation or functional loss. To obtain measurements for a service assurance function, detailed event reporting from network resources, particularly of measurement events may be used. As network nodes generate a massive number of measurement events, intelligent filtering and aggregation may be applied to reduce the amount of data, while still allowing for drill-down. In terms of measurements, numerous measurement systems have been proposed and implemented. One way to classify measurement methods is to distinguish between active and passive approaches. Active measurements involve injection of traffic into the network in order to probe certain network devices (such as PING) or to measure network properties such as round-trip time (RTT), one-way delay and available bandwidth. The results from active measurements are generally easy to interpret. However, the injected traffic may affect the network under test.

Passive measurements, either software-based or hardware-based, simply observe existing network traffic and are non-intrusive, or at least provide very little intrusion into the network under test. Network traffic may be tapped at a specific location and can be recorded and processed at different levels of granularity, from complete packet level traces to statistical figures. The results from passive measurements are often hard to interpret but have the benefits of not affecting the network under test.

Measurements can also be performed on different system/protocol layers, for example following an Open Systems Interconnection (OSI) model, including link layer, network layer, transport layer and even application layer. Existing measurement systems mainly consider network and transport layers due to privacy and legal concerns.

Measurements collected on different layers may present varied levels of granularity, from complete packet level traces to statistical figures. Measurements with the coarsest granularity are traffic counters, i.e. cumulated traffic statistics, such as packet volume and other counts. Another common practice is use flow level statistics from NetFlow (Cisco) and sFlow, containing traffic volume information of a specific flow. Despite network-wide measurement and performance estimation, the measurement systems known in the art usually take little consideration on compatibility or inter-operability. These systems are usually stand-alone, use different performance metrics, employ various underlying measurement mechanisms, and often operate off-line only. Though diverse in underlying mechanisms, these systems have the common goal of providing system-internal characteristics to applications, and their measurements overlap significantly.

In patent application WO2013044974 a system and method is described that can carry out RCA on topology information and on measurements linked with the topology to find the resource which caused the service to become unacceptable.

SUMMARY

Embodiments of the invention provide improved methods and apparatus. According to a first aspect of the invention, there is provided a method of monitoring a communications network having resources used to provide services, some of which are superordinate services which depend on contributory ones of the services. There are steps of receiving resource key performance indicators R-KPI based on measurements from the resources, of contributory services contributing to a key performance indicator KPI of a corresponding superordinate service, and receiving indications of whether the superordinate service was operating normally at times related to the received R-KPIs. A selection is made of those of the received R-KPIs which correspond to the normal operation of the service and there is a step of generating automatically from the selected R-KPIs a characteristic division of relative contributions of the R-KPIs to the corresponding KPI of the superordinate service for the times that the superordinate service was operating normally.

A benefit of generating such a characteristic division of relative contributions compared to merely determining a mathematical relationship between the R-KPIs and the resulting S-KPI is that it can enable analysis of behavior of services or underlying resources or groups of resources based on their R-KPIs for example. This can be useful for root cause analysis after abnormal operation of the service, or for trending analysis regardless of abnormal operation, or for managing the network to take pre-emptive action before a threshold is reached which could trigger conventional action. This can be particularly useful for managing larger networks where conventional thresholds and alarms can generate too much monitoring information which is hard to process, or is too late for pre-emptive action. By having the characteristic division based on measurements rather than relying only on a design inputs, the characteristic division can be more accurate by reflecting real network conditions and real usage of the services by users. By generating it automatically it can be scaled more easily to larger networks with many resources, or can provide more granularity in the characteristic division of relative contributions more efficiently. In principle a manually generated division could be useful to calibrate or validate the automatically generated one.

Embodiments can have any additional features added to those above, and some such additional features are described in more detail below and used in subclaims or may be used as disclaimers. One such additional feature is having the steps of identifying differences between at least R-KPIs other than those selected, and the characteristic division, and determining behavior of the contributory services relating to these R-KPIs based on the identified differences.

A benefit of using such a characteristic division to identify changes in behavior of the contributory services, is that it can highlight which services and underlying resources are behaving abnormally more effectively than relying only on conventional threshold based alarms at the R-KPI or possibly S-KPI level using absolute values. In case these service behaviours might affect the S-KPI, or might have affected the S-KPI, this can enable pre-emptive optimization of the network for example, or reactive analysis after an alarm, and pre-emptive or reactive analysis and action can be carried out in real time or otherwise for example.

Another such additional feature is the method being for use in a root cause analysis of a change in behavior of the service, and wherein the step of identifying the differences is carried out for R-KPIs related to the change in behavior of the service and having a step of determining the root cause based on detected anomalous behavior of the resources related to these R-KPIs. This is one of the more valuable ways of using the differences identified compared to the characteristic division.

Another such additional feature is the step of identifying which of the R-KPIs are associated with a time of the change, and selecting these associated R-KPIs for use in the step of identifying the differences. This is particularly useful where there are delays in the network which are significant compared to a sampling period of the R-KPIs for example.

Another such additional feature is the step of managing the network by managing one or more of the contributing services, based on the identified differences. This is another way of using the differences, to enable network management actions in pre-empting or in reacting to service problems, to be focused on those of the contributory services which are found to be behaving anomalously compared to the characteristic division. The management could encompass adapting any aspect of the service including controlling underlying resources or adapting alarm thresholds for KPIs of the service for example.

Another such additional feature is the step of selecting those of the received R-KPIs which correspond to the normal operation of the superordinate service having the step of determining a correspondence between at least one of the received R-KPIs and the times of normal operation based on an expected delay in how the respective resource affects the service. Again this is particularly useful where there are delays in the network which are significant compared to a sampling period of the R-KPIs for example.

Another such additional feature is the step of selecting having the step of determining whether values of the KPI of the corresponding superordinate service, obtained from measurements, are acceptable, to indicate whether the superordinate service was operating normally. This is one way of determining normal operation of the service efficiently, though other ways can be envisaged. Another such additional feature is a step of evaluating convergence of the characteristic division, by generating a sequence of candidate characteristic divisions for different time periods, and evaluating how much the sequence of candidate characteristic divisions converges towards an optimal candidate division. A benefit is that the convergence can give an indication of the accuracy of the characteristic division in networks which are unpredictably dynamic, such as radio access networks for example.

Another such additional feature is a step of validating the generated characteristic division, by identifying a mismatch between a first state of whether current R-KPIs are individually acceptable, and a second state of whether a current KPI of the corresponding service is acceptable. A benefit is that no additional measurements are needed, so this can be relatively efficient to implement, though the validation is based on a hypothesis that may not hold in all cases.

Another such additional feature is the R-KPIs comprising at least one of: delays, latency, loss ratio, noise, bit errors, packet errors, packet losses, frame errors, frame losses, amount of variation of any of these. These are particularly applicable as they are commonly monitored, are useful indicators or performance and are additive type performance indications. Amount of variation can be expressed in various ways, for example as extremes of the variation over a given period, or durations that a particular level is reached, or exceeded. Another aspect of the invention provides a program for a computer having instructions on a computer readable medium which when executed by the computer cause the computer to carry out the methods set out above.

Another aspect of the invention provides apparatus for monitoring a communications network, the communications network comprising resources for use in executing services, some of which are superordinate services which depend on contributory ones of the services. The apparatus has a selector configured to select from a plurality of resource key performance indicators R-KPI obtained from measurements from the resources, of contributory services contributing to a corresponding superordinate key performance indicator S-KPI of the superordinate service, the selection being based on an indication of whether the superordinate service was operating normally at the time, so as to select R-KPIs which correspond to the normal operation of the superordinate service. There is also a division generator configured to generate from the selected R-KPIs a characteristic division of relative contributions of the R-KPIs to the KPI of the corresponding superordinate service for the times that the superordinate service was operating normally.

Another such additional feature is a difference analyser configured to identify differences between R-KPIs other than those selected, and the characteristic division, and configured to determine behavior of the contributory services based on the identified differences.

Another such additional feature is the apparatus being configured for root cause analysis of a change in behavior of the superordinate service, by the selector being configured to select R-KPIs related to the change in behavior of the superordinate service for input to the difference analyser, and having a root cause analyser configured to receive an indication of determined behavior of the contributory services related to these R-KPIs, and to determine a root cause based on this indication.

Another such additional feature is the selector for selecting R-KPIs related to the change also being configured to identify which of the R-KPIs are associated with a time of the change, and to select these associated R-KPIs for use in identifying the differences.

Another such additional feature is a service controller configured to manage one or more of the contributory services based on the identified differences.

Another such additional feature is at least one of the selector, division generator, and difference analyser comprising a processor and a memory having instructions stored for execution by the processor.

Another aspect of the invention provides a communication network comprising resources for use by services, and having the apparatus of any of the combinations set out above.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to embodiments illustrated at the appended drawings, in which:

FIG. 8 shows a diagram of determining differences using the characteristic division, according to an embodiment, FIG. 9 shows steps of determining differences using the characteristic division according to an embodiment.

DETAILED DESCRIPTION

Figures 1, 2:
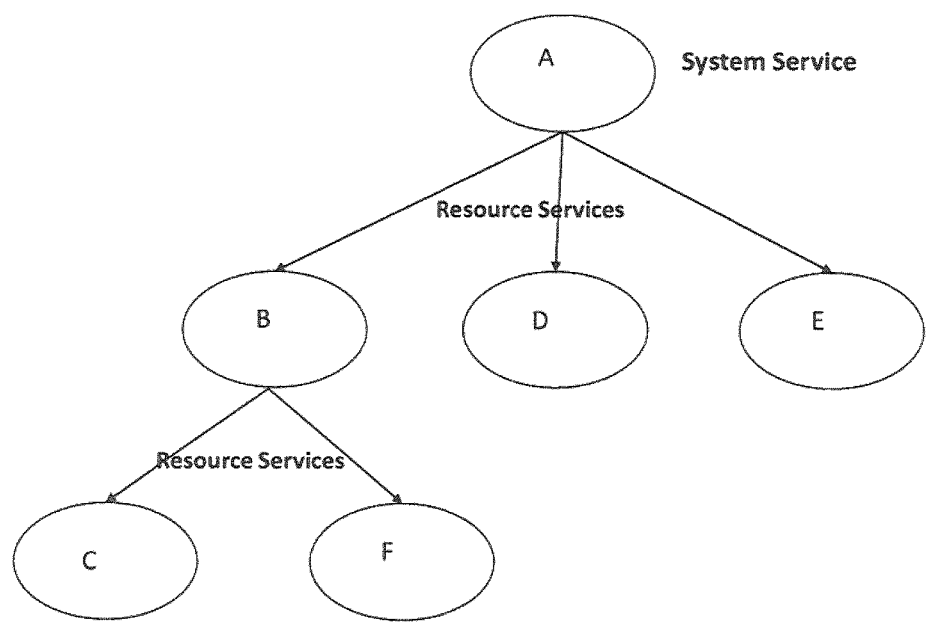
FIG. 1 shows a schematic view of a hierarchy of service dependencies.
FIG. 2 shows a schematic view of examples of delay distribution amongst different resources.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

| Abbreviations | |
|---|---|
| S-RCA | Service Root Cause Analysis |
| USP | User Service Performance |
| ReSe | Resource Service |
| KPI | Key Performance Indicator which can encompass at least S-KPI or R-KPI types |
| S-KPI | Service KPI |
| R-KPI | Resource KPI |
| SLA | Service Level Agreement |
| OSS | Operations Support System |

Definitions

References to a characteristic division can encompass any way of indicating the relative contributions for normal operation of the service. This can be a set of percentages, a set of ratios, a set of fractions, a set of absolute values from which the percentages can be derived, and so on. Each one of these percentages and so on can be indicated as a discrete value or a range or a probability distribution and so on.

References to resources can encompass discrete physical parts such as switches or links, or resource services or any functions provided by multiple parts, such as a radio access network, or backhaul connection, or multiplexing/demultiplexing. The normal operation can be indicated by measurements of S-KPI for example, or feedback from service users, or in any other way.

References to services can encompass any kind of service provided over a communications network at any level, and can encompass superordinate services or contributory services which contribute to the superordinate services. References to superordinate services can encompass any services that use or rely on another subordinate service to any degree. They can encompass system services or in some cases resource services, if such resource services are dependent on contributory services such as other resource services. System services in the USP concept described below are an example of a superordinate service. They can appear to a user to be transparent to the contributory services and the physical resources the system service depends on. Some examples of services can be consumable by human or machine end users via a terminal, other examples are possible.

References to contributory services are intended to encompass any kind of service which contribute to superordinate services above in a hierarchy of service dependencies. Some services can be both superordinate relative to some services and contributory relative to other services.

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described nodes or networks or network management systems may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to network management systems are intended to encompass any kind of such systems, not limited to those using any particular protocol, and not limited to being located at a single location and so can encompass distributed systems having functions at different locations or shared functions in a computing cloud for example.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Introduction, USP

By way of introduction to the embodiments, some issues with conventional designs will be explained. Service Providers are increasingly aware of the role the subscribers (their customers) play in their business. This awareness is expressed in the rapid introduction and deployment of service quality measurement systems that allow the operator to focus more on how subscribers experience the network quality and improve the network quality accordingly.

A User Service Performance (USP) concept has been proposed which provides a service and technology generic approach to service quality measurement as well as defining a measurement structure to support root cause analysis. See for example WO2008/121062 and WO2013044974. In the USP concept, system services and resource services are considered, both of which are examples of the services mentioned above, though other examples can be envisaged. System services, which include web browsing, streaming and television, are defined as technology-independent and as possible for an end user to experience. This end user, which can be either a person or a machine, consumes the service through a terminal such as a mobile phone, a screen or a camera. Resource services, on the other hand, are logical or physical entities that combine to deliver system services, and are based on resources such as bearers, links and nodes.

The performance of both system services and resource services is characterized by Key Performance Indicators. Service Key Performance Indicators (S-KPIs) and Resource Key Performance Indicators (R-KPIs) offer an insight into one of three quality metric groups: accessibility, which is the system's ability to provide a service upon the user's request; integrity, which is the quality of the service as perceived by the user; and retainability, which is the system's ability to provide a service session that is as long as the user needs it to be.

The terms "System Service", "Resource Service", can be treated as objects, and "S-KPI" and "R-KPI" as attributes or properties of those objects, as defined by the Ericsson USP (User Service Performance) concept. The USP concept is explained in the recent Ericsson White Paper on Service Assurance, reference [1] and an Ericsson Review article, reference [2].

System Service performance is monitored continuously and when the threshold of a S-KPI is crossed the performance of the System Service has changed from:
Performing to Underperforming or:
From Underperforming to Performing.

System Services are delivered by more Resources Services which can themselves be superordinate on other resource services, which ultimately rely on physical resources of the communications network. The performance of the complete system is a function of the performance of the individual components delivering resource services. A good performing resource service may compensate for a poorer performing resource service keeping the system service performance on track. Resource services require operation within a budget in such a way that total contributions of all resource services are reflected in the system service quality.

The maximum allowable budget on resource level can be configured by the operator manually or automatically. An advantage of manual configuration is that the operator has full control of the performance of a resource service, however to reach the lower branches of the resource service hierarchy or topology will mean that the budget has to be set for a large number of resource services. Furthermore regular updating of the resource service budget is required to allow for changed network conditions and changed subscriber behavior.

The USP concept provides the ability to identify and prioritize the S-KPIs from a user perspective, and to drill down and identify which resource services are responsible for S-KPI degradation. This can involve service root cause analysis (S-RCA) in a communication network which continuously processes measurement reports collected from multiple layers of the monitored network.

Measurements for Use in Obtaining R-KPIs

Measurements from a plurality of nodes in the communication network may be related to an R-KPI, for use in root cause analysis. These measurements may be system-internal performance characteristics (such as round trip delay, available bandwidth and loss ratio). The measurements may be active measurements, or passive measurements. The measurements may be provided by measurement systems in the communications network that may be integral to the nodes or that may be external to the nodes.

Each measurement report may include a time stamp, user and session identifier and other parameters allowing the management system to correlate different events and follow service sessions across the network. The measurements may be received in an information structure, which, for a data path of a connection, represents logical and physical connectivity resource services involved in said connection. Alternatively or in addition, measurements are received in an information structure, which, for a control path of a connection, represents logical and physical connectivity and control function resource services involved in said connection.

An identifier may be determined for each of the received measurements, or, alternatively, an identifier may be determined for only some of the received measurements. If a measurement does not have an identifier determined, this measurement is not used in embodiments of the present invention. An identifier may be determined for one measurement and this identifier may be used for other similar measurements, in order to minimize processing, increase speed and decrease costs.

There are various disadvantages with the existing analysis solutions. For example, the existing solutions do not take into account that the network equipment has implicit knowledge about relations between measurements related through their Resource Service (ReSe) relation. Further, existing solutions continuously process all measurements to capture relations and aggregate measurements therefore losing valuable information that could be used for trouble shooting. Furthermore, existing solutions rely on unstructured network measurements and thus try to make the best out of the situation. The lack of meta data in counters makes it very hard to correlate measurements from different resources especially on session level. It is also known from WO2012055449 to collect R-KPIs and an S-KPI for a user service instance, and determine a mathematical relationship in terms of how the S-KPI can be derived from its constituent R-KPIs. For a cluster of users of the same service, a representative or average relationship of how an S-KPI is obtained mathematically from its constituent R-KPIs is derived. This relationship is used to estimate S-KPIs of other user equipment devices which don't report their S-KPI. This cluster based estimate can enable monitoring of user services to be scaled up without causing undue increase in network traffic or processing load. However this relationship cannot be used to analyse behavior of contributory services.

FIG. 1, Topology and Hierarchy of Service Dependencies

A network topology may be deduced using the identifiers for the received measurements. The identifiers can comprise pointers to connection objects and by analysing the identifiers it is possible to determine topology of the network. The network topology that is determined comprises information about network nodes and physical links connecting the nodes. Additionally, in alternative embodiments the network topology also includes information about terminals connected to the network, logical links between the nodes or terminals (node to node, terminal to node, terminal to terminal) as well as services executed in the network. In embodiments the identifier may be a Resource Service (ReSe) identifier, which when linked to a network topology, identifies to which resource service the measurement belongs. The identifier may be a User Plane Reference identifier, which identifies the relation between the user plane and the control plane. The identifier may also identify related resource services that are associated with supporting an end user session. Nodes and network paths are identified that participate in a monitored System Service or end user service delivery, in order to infer resource service paths (and path segments) related to the particular service delivery, by using the identifiers for the received measurements to determine a topology of the network.

In some embodiments determining the network topology from the identifiers to identify paths participating in the monitored services is complemented by looking up traffic forwarding tables (such as routing tables and MPLS label switching tables) based on identifiers and IP addresses. Measurements are linked along the inferred resource service paths based on their identifiers.

FIG. 1 shows an example of a hierarchy of dependencies of services. A superordinate service such as system service A relies on contributory services, shown here as resource services B, D and E. Resource service B is also an example of a superordinate service as it relies on resource services C and F. Resource services can encompass functions of resources such as communications infrastructure, or services using such functions.

Characteristic Division (Budget)

To distinguish the resource which is the cause for the breach, the partitioning or division of the performance responsibility should be understood. This division is referred to here as a characteristic division or set, or more colloquially as a budget for the service, made up of contributions of the resources to the service. A budget can also refer to a resource budget, meaning the contributions of lower level resources to one resource used by the service. Budgets can be represented in relative or absolute terms. The budget model is particularly applicable to cumulative or additive resource KPIs, such as delay. Other additive resource KPIs may include error ratio and packet loss—for example, radio network may have a maximum of loss ratio 1% as its budget, while core has 0.5% loss ratio in contrast.

However, it is clear that for a resource KPI like throughput, accessibility and retainability, the budget concept is less applicable as the properties for these KPIs are not typically additive.

To maintain a budget manually is costly. To use a wrong budget in RCA can give wrong results i.e. identifying a resource which is not the cause. Often there is no clear budget configured. The budget is spread over a multitude of resources which may not even be known by each other. Instead of applying manual and fixed value for resource service budgets, embodiments, some of which are described in more detail below can provide automatic determination and validation of the distribution of the resource service budget across the resource service instances.

The SySe specification determines the overall requirements to the resource service budget (i.e. the total cost). The requirements may be the same across the network and over time, however the distribution of the costs across the resource service branches may vary depending on network configuration and other factors.

FIG. 2, Examples of Delay Distribution

FIG. 2 shows four rows of blocks, each block representing an R-KPI in the form of a time delay. Each row represents a different time period or session of the system service, and the lightest blocks are the delay of resource service C, and darker blocks respectively represent delay of resource services E, F and D. The maximum delay is specified as "Max S-KPI delay". Session 4 experiences a S-KPI max delay breach. For each session the resource service delay for a resource service may vary, however the total delay (S-KPI threshold) may not exceed a predefined limit. Assuming that 1 unit is 10 ms, the SySe threshold is 80 ms. As long as the total delay is within the 80 ms, the individual resource service performance is not needed for the root cause analysis. Only when the threshold is breached as in session 4 there is a problem for which we need to find the offending resource service.

TABLE 1

Overview of ReSe budgets for different sessions.

| ReSe -> SySe | C | F | D | E | Total | Threshold | Threshold breached |
|---|---|---|---|---|---|---|---|
| Session 1 | 10 | 20 | 20 | 10 | 60 | 80 | No |
| Session 2 | 20 | 30 | 10 | 20 | 80 | 80 | No |
| Session 3 | 50 | 10 | 10 | 10 | 80 | 80 | No |
| Session 4 | 60 | 10 | 10 | 10 | 90 | 80 | Yes |

How do we know which the offending resource service is? From the table it is apparent that C is the offending resource service as it deviates most when comparing the 4 sessions to each other. Note that some of the resource service delays vary but the variations is much less than resource service C. Automatic configuration of the resource thresholds is well described in the literature and some examples will be summarized here.

Reference [6], U.S. Pat. No. 5,751,964 shows automatically determining and updating thresholds based on collected data samples for counter variables being monitored by a network management application. Historical data is accumulated and used to determine the mean and standard deviation of the monitored counter variables based on the aggregated sample values and a threshold factor is applied to the standard deviation and the resulting value added to the mean to establish the threshold value. The threshold value, which is adaptively updated, is used to determine whether the subsequently sampled values of the monitored counter variables are within a normal range, or that a potential problem exists requiring intervention by a network operator.

It is also known that a fundamental enabling technology for performance management is automatic computation and adaptation of statistically meaningful performance thresholds for system components. A paper from David Breitgand, Ealan Henis, Onn Shehory: 'Automated and Adaptive Threshold Setting: Enabling Technology for Autonomy and Self-Management'; Proceedings of the Second International Conference on Autonomic Computing (ICAC '05) shows formally defining the problem of adaptive threshold setting with controllable accuracy of the thresholds and proposes a novel algorithm for solving it. Given a set of Service Level Objectives (SLOs) of the applications executing in the system, this algorithm continually adapts the per-component performance thresholds to the observed SLO violations. The purpose of this continual threshold adaptation is to control the average amounts of false positive and false negative alarms to improve the efficacy of the threshold-based management.

Issues with existing solutions include the accuracy and costs. Regarding accuracy of determined thresholds, performance characteristics of resource services may evolve over time, due to a number of factors, such as increasing population and network reconfigurations. Regarding increase of subscriber population; it is expected that LTE subscribers may increase sharply in the coming years. Such increase would increase load on nodes, which further affects resource service characteristics; thresholds should be updated correspondingly to keep RCA still working. Regarding changes of networks; in order to handle increasing load, new nodes may be added to existing networks, or replacing existing nodes. Core nodes may be re-configured to handle increases of data traffic. Offloading devices may be deployed accordingly. thresholds have to be adapted to such changes.

Due to the dynamic nature of network resources, especially for radio access networks, the determined thresholds using the conventional solutions described above may not be accurate. In particular, due to the complexity of networks, there might be spikes in measuring the S-KPIs and R-KPIs, which doesn't reflect normal resource situations. Also it is likely that, due to propagation delay of failures, non-breaching of system service KPIs do not always indicate that the resource service KPIs are still in threshold. Especially for additive resource KPIs, such as delay, a good performing resource service may compensate for a poorer performing resource service keeping the system service performance on track.

In short, the thresholds calculated in the conventional solution described above may be preliminary and inaccurate. RCA based on such thresholds would identify wrong resources as the causes.

Feasibility in terms of computation costs may be an issue if applied to complex systems like today's communication networks. In order to reflect real-time status of a network, hundreds of thousands of measurements have to be collected, or reported, to network management systems. Thresholds need to be calculated in (near) real-time to catch up with the speed of measurement collection and make the results ready for (root) cause analysis. The modeling approach (i.e. modeling of SLO violations using logistic regression) and the subsequent adjustment of thresholds may not be feasible in real-world scenarios.

The above mentioned Breitgand et al. paper may be too theoretical, since it makes the following assumptions, which may not be realistic or practical in an operational network:

"This requires that the system operates for a sufficiently long period of time and the underlying stochastic process remains stationary for sufficiently long."

"From a practical perspective it is important that the threshold setting algorithm converge fast to the desired PPV and NPV levels when the underlying statistical process stabilizes."

Figure 3:
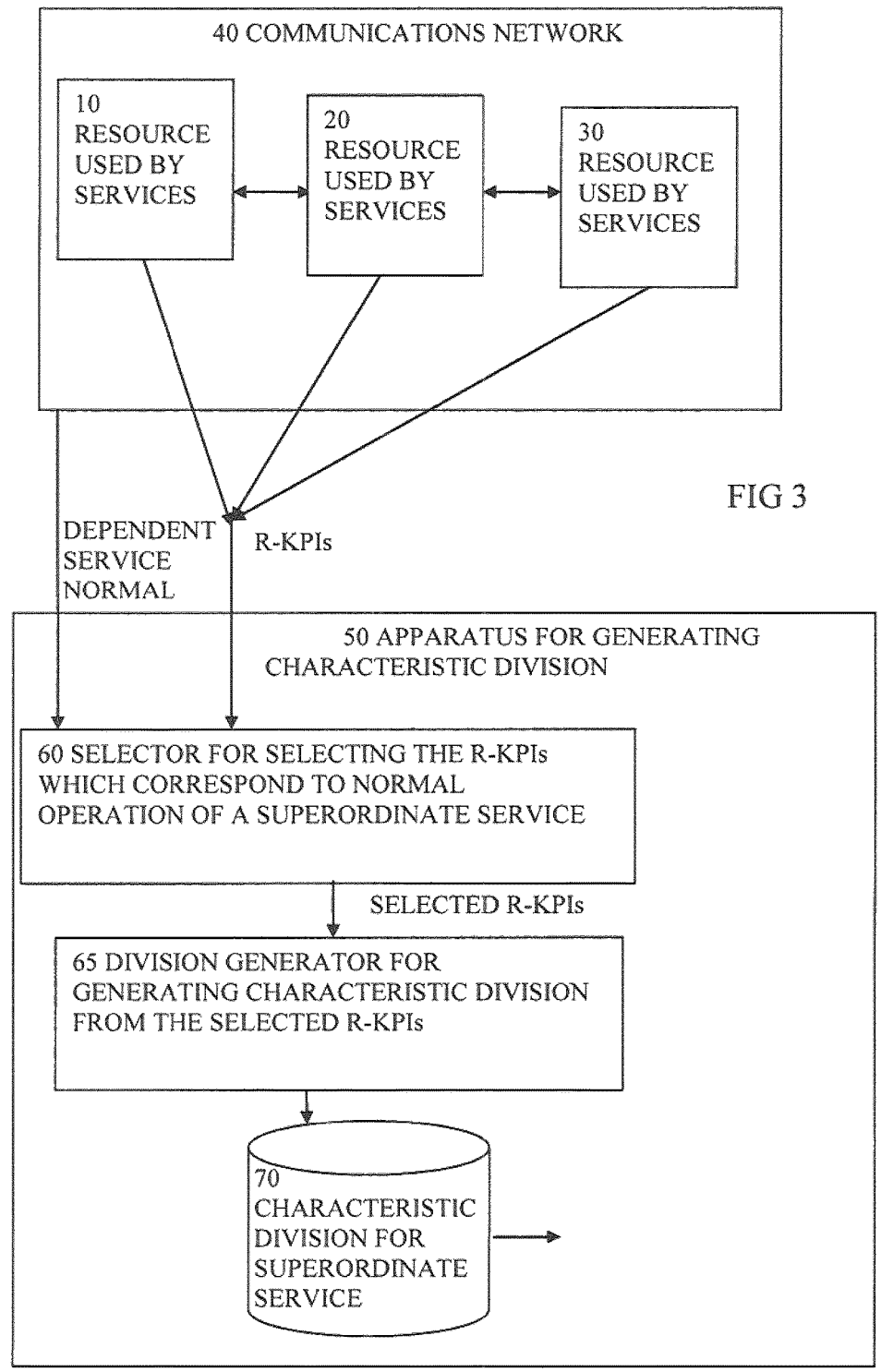
FIG. 3 shows a schematic view of apparatus according to an embodiment.

FIGS. 3, 4, 5, 6, Embodiments for Generating a Characteristic Division of the Contributions of the Resources FIG. 3 shows a schematic view of resources 10, 20, 30 of a network 40 used by services, and apparatus 50 for generating a characteristic set or division of the relative contributions of the contributing services to a superordinate service. The apparatus for generating the characteristic division can be implemented as a function within a network management system, or separately from the network managements system for example. The apparatus is coupled to receive R-KPIs relating to contributory services, directly or indirectly from their associated resources, either in real time, or as stored representations of past events for example. An indication of when the superordinate service was operating normally is also received by the apparatus. Various ways of implementing this can be envisaged. The apparatus can have a selector 60 for selecting which of the R-KPIs correspond to normal operation of the superordinate service, and a division generator 65 for generating the characteristic division from the selected R-KPIs, for output to a store 70 in this example. The selector and the division generator can be implemented as program modules for execution by a processor, or as modules in an ASIC or in any kind of circuitry, and can be distributed at different locations or centralized for example. This characteristic division can be useful for various purposes including root cause analysis, for example.

Figure 4:
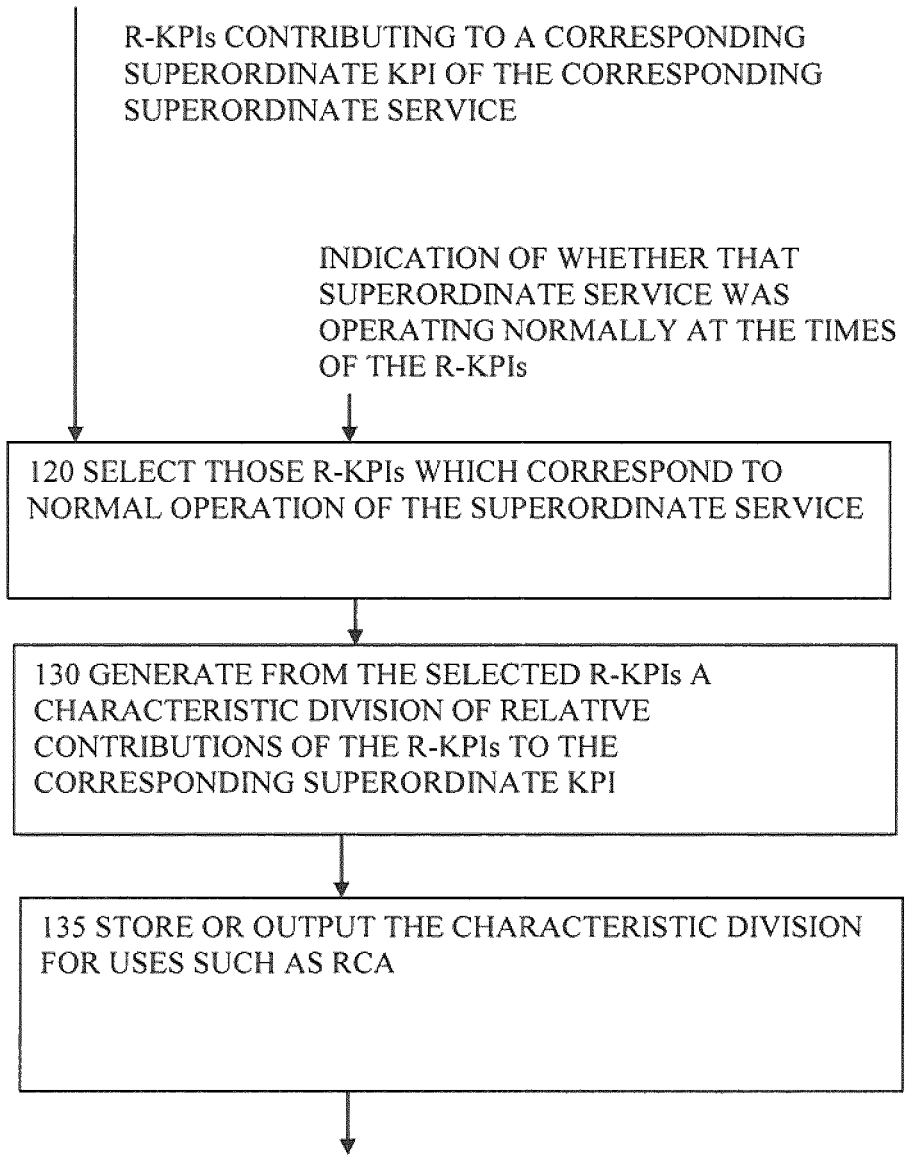
FIG. 4 shows steps according to an embodiment for generating a characteristic division of the contributions of the resources.

FIG. 4 shows steps in operation of an embodiment for generating the characteristic division. As shown, at step 120 there is a selection made of which R-KPIs correspond to normal operation of the superordinate service. This is based on the R-KPIs which are contributing to a corresponding superordinate KPI of the corresponding superordinate service, obtained from measurements from resources. The selection is also based on an indication of whether that service was operating normally at the times of the R-KPIs. The R-KPIs may be received directly from the resources or the selection may be made from stored R-KPIs for example. In this case the selector need not receive all the R-KPIs, but may examine their timestamps for example and thus select without explicitly receiving and examining them. A characteristic division of relative contributions of the selected R-KPIs is generated at step 130, and at step 135 this is stored or output for uses such as RCA. In some embodiments, the characteristic division is repeatedly updated using more up to date measurements.

Thus the characteristic division of contributory or resource services R-KPI is determined based on measurement samples collected when the superordinate service depending on it, does not breach an acceptable performance threshold. Optionally the selection can also exclude cases where the R-KPI exceeds its own threshold, even if that does not cause the service to breach its threshold. In some embodiments a convergence factor of the characteristic division of the contributory services is further evaluated, and the characteristic division made available for root cause analysis only after it converges.

In some embodiments the characteristic division is validated based on system service S-KPI breach status or contribution distributions between related services (system service—resource service or resource service—resource service). If this validation is not passed, the determination process for the characteristic division is restarted.

Figure 5:
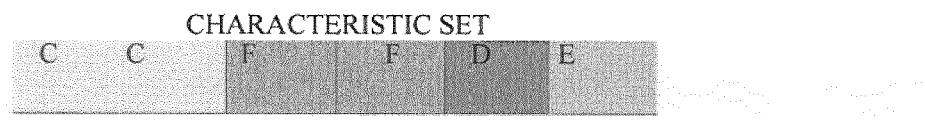
FIG. 5 shows a schematic view of an example of a characteristic division.

FIG. 5 shows a schematic view of an example of a characteristic division generated based on the R-KPIs shown in FIG. 2. In this case the share of resource service C is 2 parts out of 6, the share of resource service F is 2 parts out of 6, the share of resource service D is 1 part out of 6, and the share of resource service E is 1 part out of 6. This reflects an averaging or weighting based on the first three rows of FIG. 2, the fourth row was not used as it corresponds to non normal operation, indicated by a breach in the superordinate service S-KPI threshold. The characteristic division represents the relative contributions, and so can be represented as dimensionless ratios, or can be absolute values since the ratios can be deduced directly from the absolute values. There can be separate characteristic divisions for each service or each type of service, or each type of user of a service for example.

Figure 6:
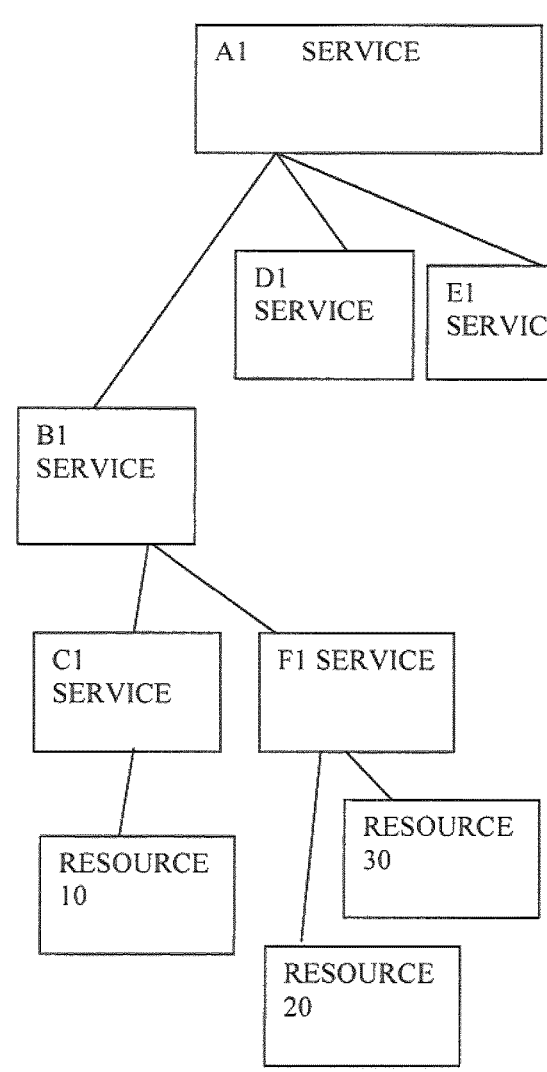
FIG. 6 shows a schematic view of a hierarchy of service dependencies similar to that of FIG. 1 and showing when services are regarded as subordinate or contributory.

FIG. 6 shows a schematic view of a hierarchy of service dependencies similar to that of FIG. 1 and showing when services are regarded as subordinate or contributory. Service A1 is shown making use of services B1, D1 and E1. Service B1 makes use of services C1 and F1. C1 makes use of resource 10, or is a function carried out by that resource. F1 makes use of resources 20 and 30, or is a function carried out by those resources. For the purpose of analyzing services C1 and F1, a characteristic division for B1 is generated, and C1 and F1 are contributory services and B1 is a superordinate service. For the purpose of analyzing services B1, D1 and E1, a characteristic division for A1 is generated, and B1, D1 and E1 are contributory services and A1 is a superordinate service.

Figure 7:
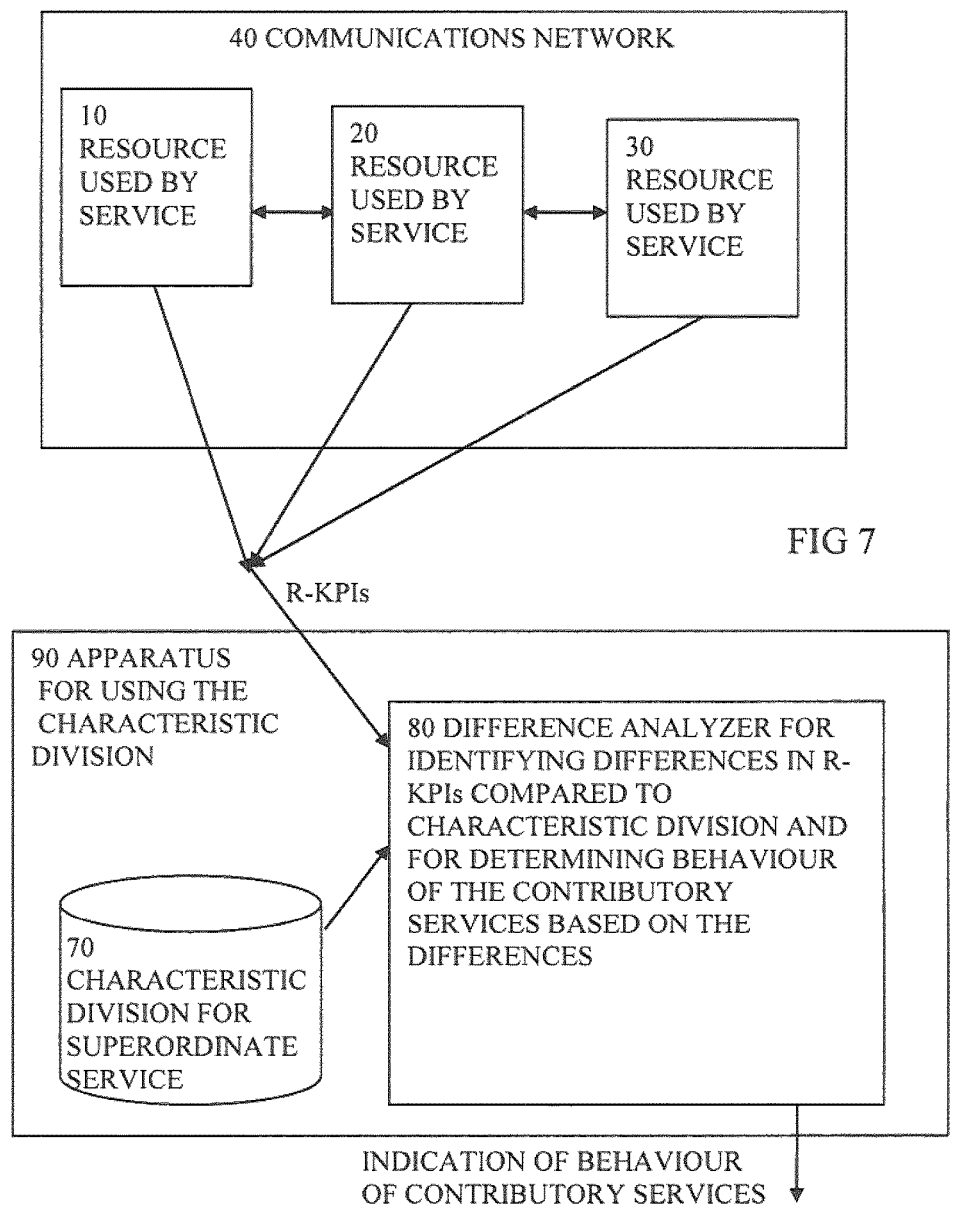
FIG. 7 shows a schematic view of apparatus for using the characteristic division according to an embodiment.

FIGS. 7, 8, 9, Embodiments Using the Characteristic Division

FIG. 7 shows a schematic view of resources 10, 20, 30 of a network 40 used by a service, and apparatus 90 for using the characteristic division of the relative contributions of the resource services to the superordinate service. The apparatus for using the characteristic division can be implemented as a function within a network management system, or separately from the network managements system for example. The apparatus has a difference analyzer 80 coupled to receive R-KPIs from the various resources, either in real time, or as stored representations of past events for example. The difference analyzer is configured to identify differences between the received R-KPIs and the characteristic division, received in this case from a store 70. The analyzer can then use the differences for determining behaviour of the resources used for the service. This can encompass determining anomalous behavior, doing trend analysis and so on. Again the difference analyzer can be implemented as program modules for execution by a processor, or as modules in an ASIC or in any kind of circuitry, and can be distributed at different locations or centralized for example. The main steps of the operation are shown in FIG. 9 and shown diagrammatically in FIG. 8.

In FIG. 9 step 130 is providing or generating the characteristic division from selected R-KPIs. An example of this characteristic division is shown diagrammatically at the top of FIG. 8, which corresponds to the characteristic division shown in FIG. 5. At step 140, the differences are identified between other R-KPIs not selected for the generating, and the characteristic division of the contributory services for the particular superordinate service. Examples of these R-KPIs are shown as three rows in the middle of FIG. 8, for time 1, time 2 and time 3 respectively, similar to the example of FIG. 2. The differences resulting from the comparison with the characteristic division are shown as three rows at the bottom of FIG. 8, again for times 1, 2, and 3, respectively. At step 150, deduction of anomalous behaviour and which contributory services show this anomalous behaviour is carried out, based on the differences. An example of this deduction, based on the differences in FIG. 8, is that the most anomalous behaviour is the three boxes relating to delays of resource service C in the second and third rows representing times 2 and 3 of the resulting differences.

Figure 10:
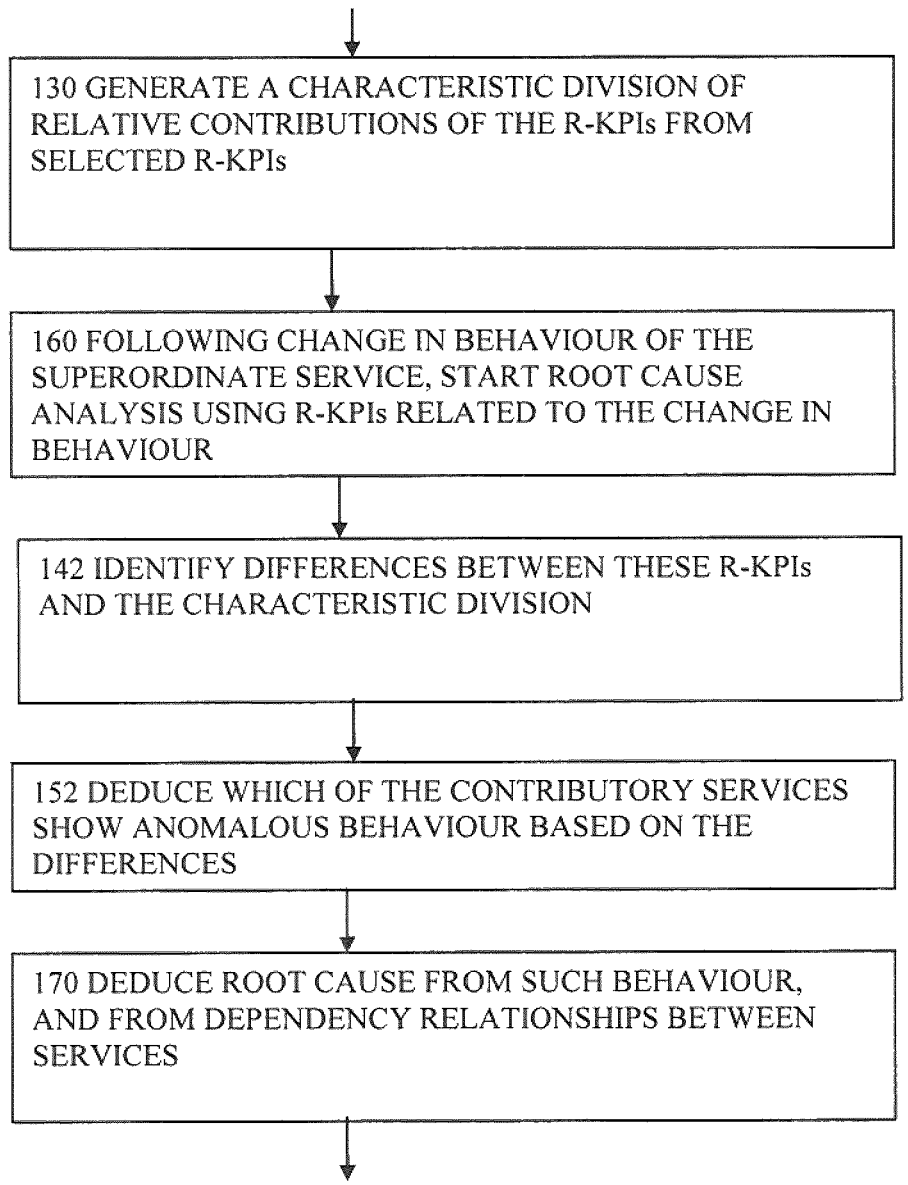
FIG. 10 shows an embodiment similar to that of FIG. 9 and showing using the characteristic division for RCA.
Figure 11:
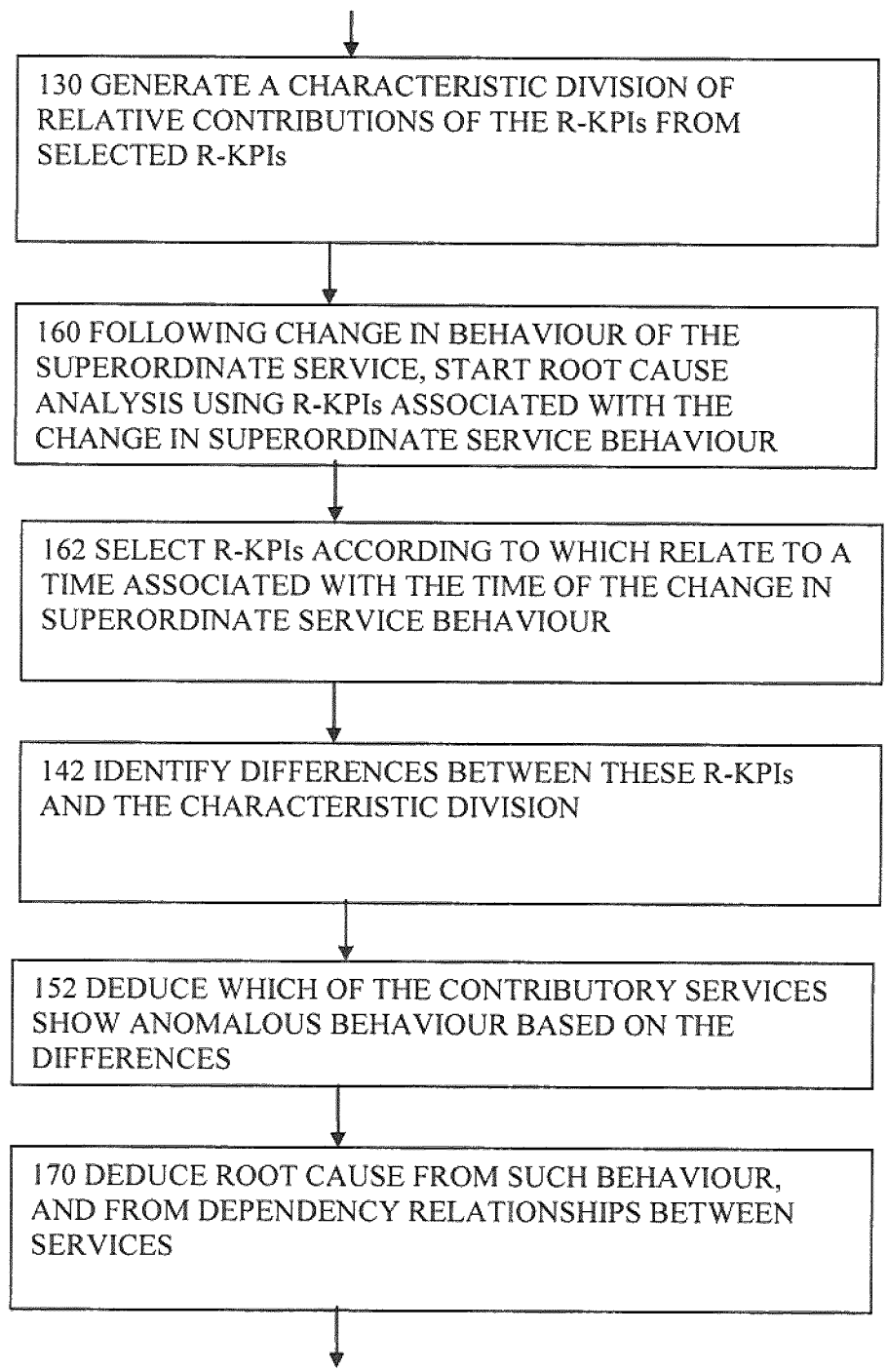
FIG. 11 shows a similar embodiment to that of FIG. 10, with selection of R-KPIs according to which relate to a time of the change in service behaviour.

FIGS. 10, 11 RCA Examples.

FIG. 10 shows an embodiment similar to that of FIG. 9 and showing using the characteristic division for RCA. As in FIG. 9, the step 130 is providing or generating the characteristic division from selected R-KPIs. At step 160, following a change in behaviour of the superordinate service, the root cause analysis is started using selected R-KPIs related to the change in behaviour of the superordinate service. At step 142, the differences are identified between these selected R-KPIs, and the characteristic division of the contributions of the contributory service for the particular service. At step 152, deduction of behaviour and which contributory services show this behaviour is carried out, based on the differences. At step 170, the behaviour and which contributory services show it is used in deducing a root cause, based also on dependency relationships between the services. This step can make use of established root cause analysis techniques. Examples are shown in reference [4]. FIG. 11 shows a similar embodiment, but in this case, there is a step 162 of selecting R-KPIs according to which relate to a time of the change in service behaviour. As there may be a delay between operation of a contributory service and its effects on the behaviour of the superordinate service, this may need to be accounted for in determining which RKPIs relate to the change in behaviour of the superordinate service.

Figure 12:
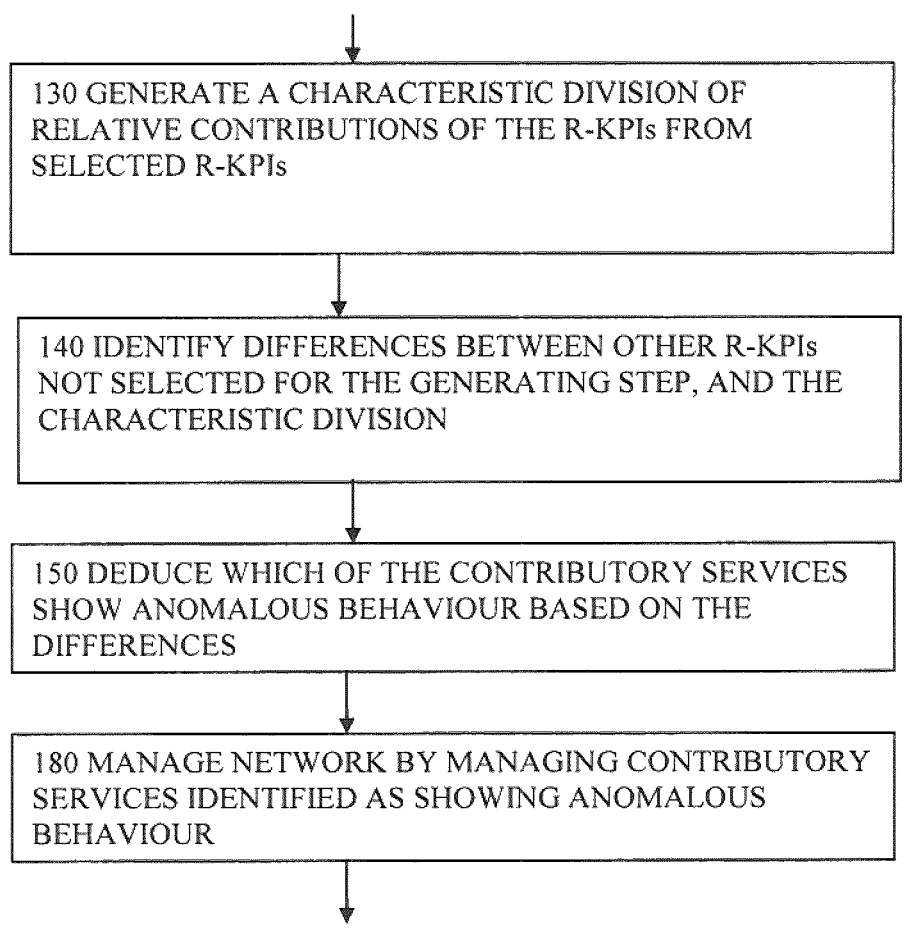
FIG. 12 shows an embodiment similar to that of FIG. 9 and showing using the characteristic division for managing resources.

FIG. 12, Network Management

FIG. 12 shows an embodiment similar to that of FIG. 9 and showing using the characteristic division for managing resources. As in FIG. 9, the step 130 is providing or generating the characteristic division from selected R-KPIs. At step 140, the differences are identified between the R-KPIs, and the characteristic division of the contributions for the particular superordinate service. At step 150, deduction of behaviour and which contributory services show this behaviour is carried out, based on the differences. At step 180, these results are used to manage the network by managing services identified as showing the behaviour. This can be carried out even if there is no degradation in the superordinate service. For example the behaviour might be anomalous and reveal a bottleneck in the network which could be addressed by rerouting some traffic or by providing more capacity or changing alarm thresholds for example.

Figure 13:
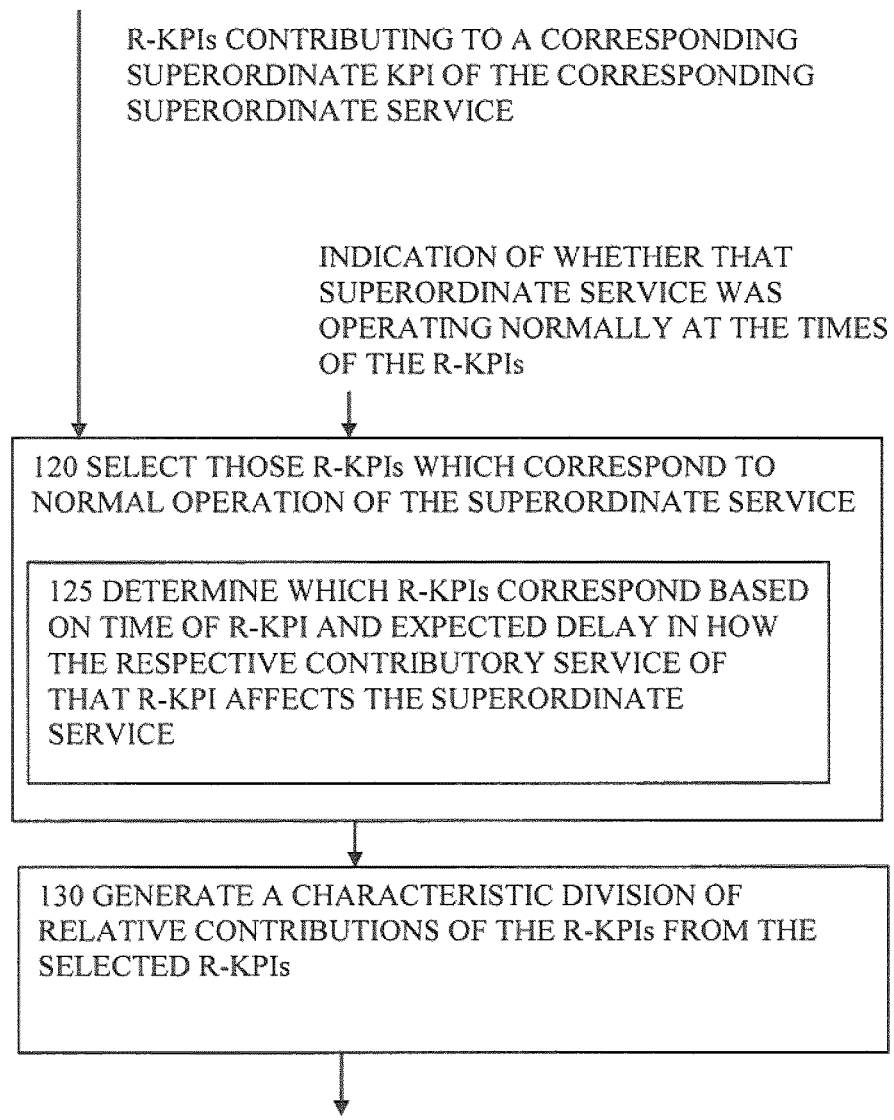
FIG. 13 shows steps according to an embodiment with selection of R-KPIs accounting for delayed effects.

FIG. 13 Embodiment with Selection of R-KPIs Accounting for Delayed Effects

FIG. 12 shows an embodiment similar to that of FIG. 4, for generating a characteristic division. Notably the step 120 of selecting which R-KPIs to use for generating the characteristic division has a step 125 of determining a time of the measurements of the R-KPIs and an expected delay in how the respective resource of each R-KPI affects the behaviour of the service. This can help ensure the selection of R-KPIs takes account of such delays.

Figure 14:
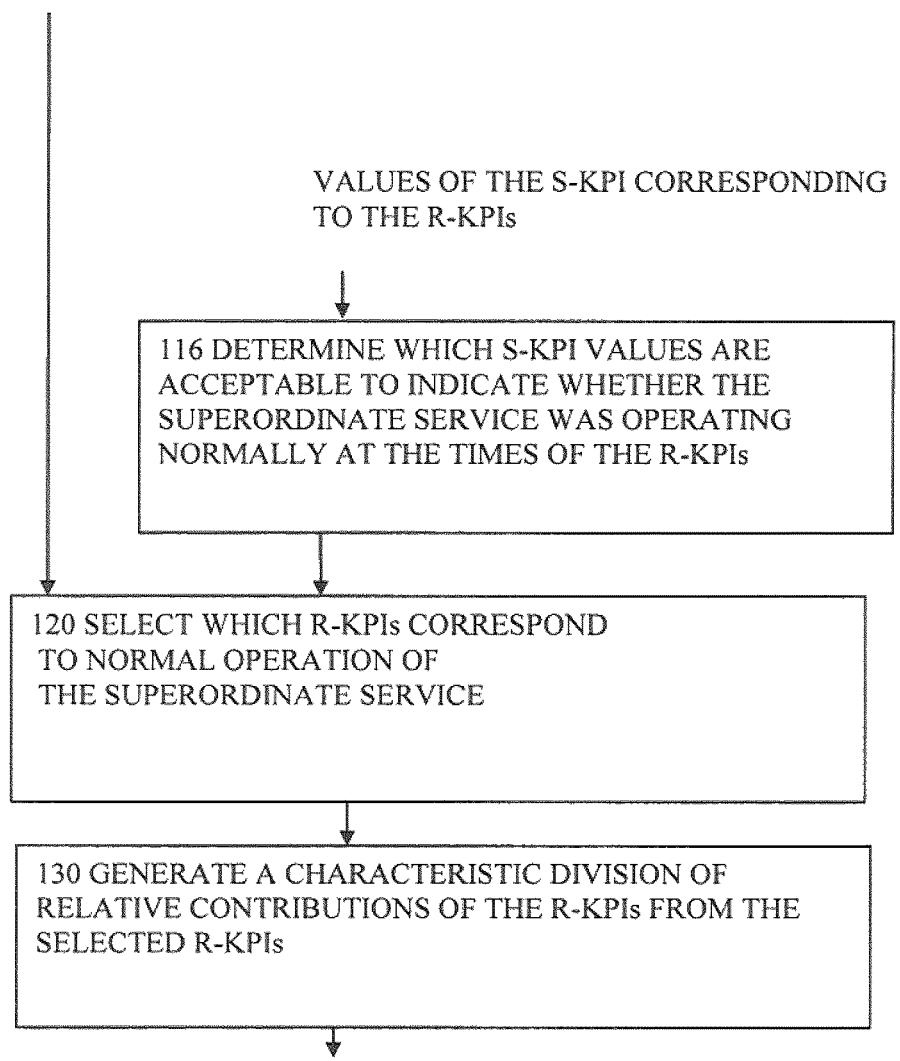
FIG. 14 shows an embodiment with S-KPIs used to indicate normal operation of the service.

FIG. 14 Embodiment with S-KPIs Used to Indicate Normal Operation of the Service

FIG. 14 shows an embodiment similar to that of FIG. 4, for generating a characteristic division. Notably the indication of whether the superordinate service was operating normally is provided from values of the S-KPI corresponding to the R-KPIs of the contributory services on which the superordinate service depends. At step 116, which of those S-KPI values are acceptable is determined, to indicate if the superordinate service is operating normally. This can be implemented by a comparison with a threshold for example. The threshold can be determined and updated automatically using any conventional technique for example, and some are set out in prior art cited above.

Figure 15:
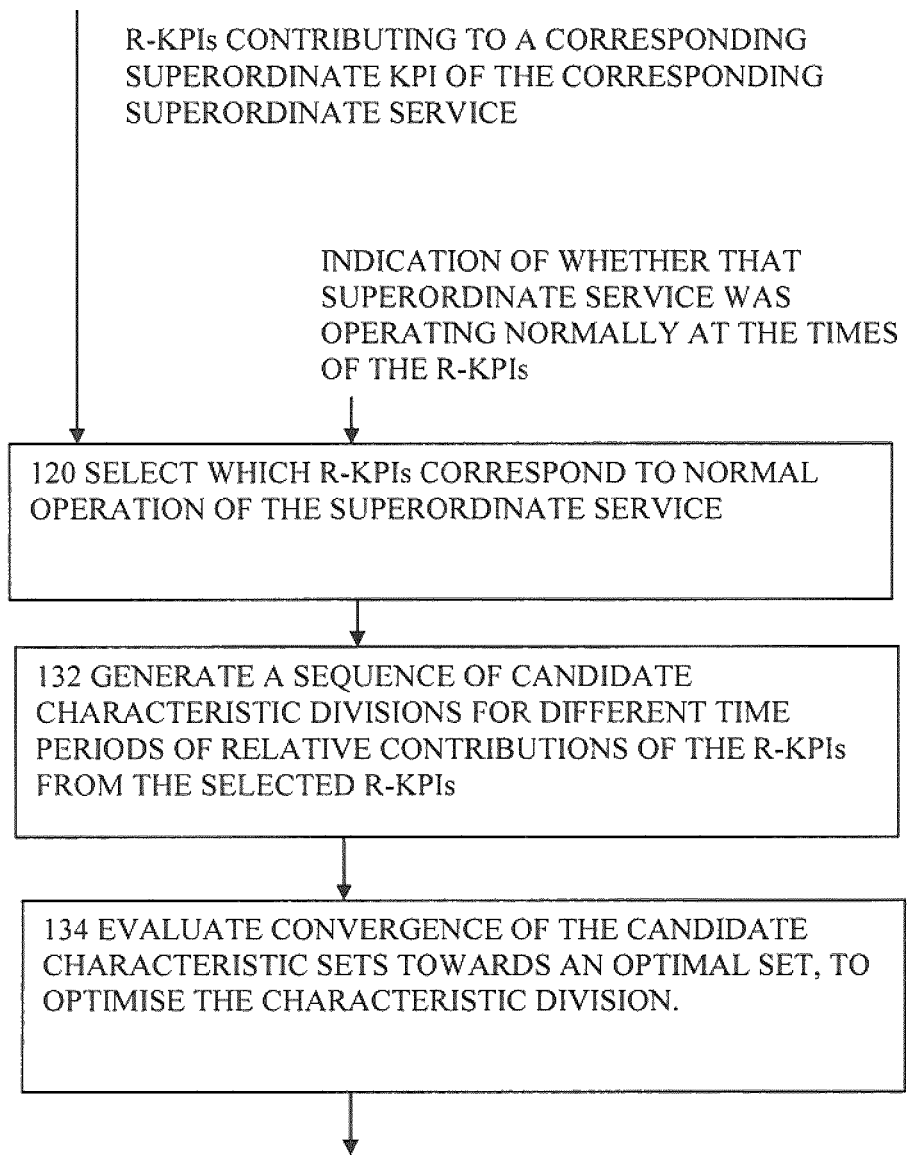
FIGS. 15 and 16 show steps in embodiments having convergence evaluation.
Figure 16:
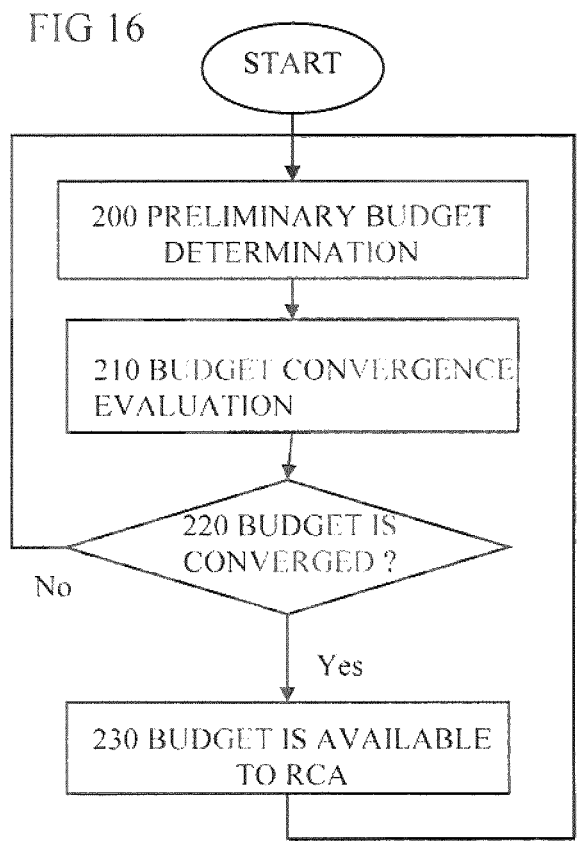

FIGS. 15, 16 Convergence Evaluation

In some embodiments for generating the characteristic division, a convergence factor of various candidate characteristic division calculations for the budget of a superordinate service S-KPI is evaluated. The budget is made available for root cause analysis only after it has converged. FIG. 15 shows steps for generating the characteristic division with such convergence evaluation. As in FIG. 4 there is a selection step 120. In place of step 130, there is step 132 of generating a sequence of candidate characteristic divisions for different time periods. Then at step 134, convergence of these candidate characteristic divisions is evaluated.

The convergence evaluation can be arranged as shown in FIG. 16, where the candidate characteristic division is referred to as a preliminary budget. At step 200 a preliminary budget determination is made. The budget determination process calculates the available budget. The process can be applied to each individual ReSe and each of the performance parameters for that ReSe. Note that the proposed budget convergence evaluation is to accumulate the preliminary budgets of multiple sessions (of the same superordinate service) into a sequence and then evaluate the convergence of the sequence. An alternative embodiment can be envisaged that accumulates the preliminary budgets over multiple time windows (if available) for convergence evaluation. Preliminary budget determination at step 200 is to determine a preliminary budget for a service, based on measurement samples of a service session. The calculation is based on the dependency between services, which is described in more detail in references [1] and [2] for example.

With reference to the example of a dependency model of FIG. 1 showing the dependency of System Service A to Resource Service B, D and F. Resource Service B depends on C and F, an example of budget determination will be described.

Without losing generality, we assume a system service A, is dependent upon a resource service B; B is further dependent upon a low level resource service C. Measurement samples of the system service KPIs of A and resource service KPIs of B and C are continuously collected. More detailed description of possible methods of measurement collection is presented in WO2008/121062 and WO2013044974 for example. Within each pre-defined time window t_w, the collected measurement samples of R-KPIs of resource service B are further correlated with those of KPIs of system service A based on their timestamps. In particular, for each R-KPI measurement of a resource service B session with a measurement period [t, t+delta_t], the S-KPI measurements of the corresponding system service A session are filtered out based on the measurement period.

In case that multiple measurement samples of A fall into the same measurement period, the most recent measurement sample of A shall be considered (based on the fact that causes always occur ahead of the symptoms). If the corresponding S-KPIs of A do not breach an acceptable threshold, i.e. the corresponding measurements falling under the thresholds, the R-KPI measurements of B are selected for further budget determination of B. If the corresponding S-KPIs of A are breached, the R-KPI measurements of B are ignored.

The selected R-KPI measurements are used to determine the mean and standard deviation of the monitored R-KPI of the service B session. A preliminary budget for the monitored resource service B session is determined by applying a pre-defined budget factor to the standard deviation and the resulting value added to the mean (as described in U.S. Pat. No. 5,751,964). That is:

P_BUDGET=MEAN+STD*BUDGET_FACTOR

Notable differences with conventional techniques are that (1) the measurements in at least some embodiments are selected based on correlations with depending resource service KPI measurements, and (2) in some embodiments the determined budgets are only preliminary or candidate ones, subject to further refinements as described in following.

Budget Convergence Evaluation

At step 200, a preliminary or candidate budget is determined for each resource service session, over a pre-defined time window. A characteristic division for a service can then be assembled from the budgets for each of the contributory services used by the superordinate service. Due to the dynamic nature of network resources, especially for radio access networks, the determined budgets may not be accurate since the measurements may be affected by many different factors. This step is to further refine the determined preliminary budgets by evaluating their convergence status.

Budget convergence evaluation at step 210 can involve taking the determined budgets of multiple sessions (of the same resource service) in a sequence and evaluating the convergence of the sequence. In particular, this is to evaluate whether the determined budget from different sessions of the same resource converges to a fixed value, or whether the probability of an "unusual" outcome becomes smaller and smaller (i.e. convergence in probability). That is, a sequence of budgets $\{X_n\}$ converges in probability towards X, if for all $\varepsilon>0$, $$\lim_{n\to\infty} Pr(|X_n - X| \geq \varepsilon) = 0$$

Formally, pick any $\varepsilon>0$ and any $\delta>0$. Let $P_n$ be the probability that $X_n$ is outside the ball of radius $\varepsilon$ centered at X. Then for $X_n$ to converge in probability to X there should exist a number $N_\delta$ such that for all $n \geq N_\delta$ the probability $P_n$ is less than $\delta$.

Reference is made to the following link for a more formal definition of the convergence (of random variables): http://en.wikipedia.org/wiki/Convergence_of_random_variables An implementation of the budget convergence evaluation is as follows:

For a sequence of budgets $\{X_n\}$ of multiple sessions,
1. Rank $\{X_n\}$;
2. Remove outliers from $\{X_n\}$: $\{X_n\} \rightarrow \{Y_k\}$;
3. Calculate the mean $Y_0$ of $\{Y_k\}$ as the converged budget;
4. Calculate the convergence factor $\alpha$, $\alpha = (SQRT(\Sigma(X_i - Y_0)^2/n))/Y_0$
5. If $\alpha$ is larger than a pre-defined value, then the budget sequence diverges; otherwise it is regarded as converging.

Note that $\alpha$, although similar, is not the standard deviation or population standard deviation. Reasons for removing outliers from the budget sequence can be as follows:
1. Due to the complexity of networks, there might be spikes in measuring the KPIs, which doesn't reflect normal resource situations;
2. It is likely that, due to propagation delay of failures, non-breaching of system service KPIs does not always indicate that the contributory service KPIs are still in budget.

Cluster analysis is a primary method for outlier detection. K-means or DBSCAN, as two well-known clustering algorithms, are both applicable to the proposed solution. The details of the algorithms can be found here (with pseudo codes): DBSCAN: http://en.wikipedia.org/wiki/DBSCAN K-means: http://en.wikipedia.org/wiki/K-means_clustering After removing outliers, the results may produce two clusters, showing there is divergence, or a single cluster, showing there is convergence. Unfortunately, considering the impact of parameters on the accuracy of clustering, the number of resulting clusters should not be considered as a proof of convergence. Calculation of a convergence factor $\alpha$ is still required.

Note that convergence in probability is just one implementation of the convergence evaluation method. Other convergence of random variables, such as convergence in mean, can also be used for evaluating convergence of budgets.

Budget Determination, Sequence Converged

If the budget sequence is found to converge, at step 220, the mean of the budget sequence (after outlier removal) is determined as the budget of the service, which is made available at step 230 for root cause analysis or any other use. In the case that the budgets across multiple time windows t_w are available, further statistical analysis can be applied to improve the accuracy of the budgets.

Budget Determination, Sequence Diverged

If the budget sequence is found to diverge at step 220, the divergence means the determined budgets are fluctuating, which may lead to inaccurate results in cause diagnosis. So the budget for this service should not be used for root cause analysis. Further preliminary budget determination process is required and the method returns to step 200. In case that the budget (i.e. the mean of the budget sequence) has to be used for RCA, the drill-down operation based on this budget shall be marked with low priority (in cause determination).

The determined budget sequence is then treated as historical data, completely or partially based on a pre-defined sliding window. Such historical budget data may be used together with recent budget sequence to carry out budget convergence evaluation.

The described convergence determination process is not limited to the budget for the system service, and may be iteratively applied to determining the budget of individual contributory service on which the superordinate service depends, and down to the lowest resource levels.

Figure 17:
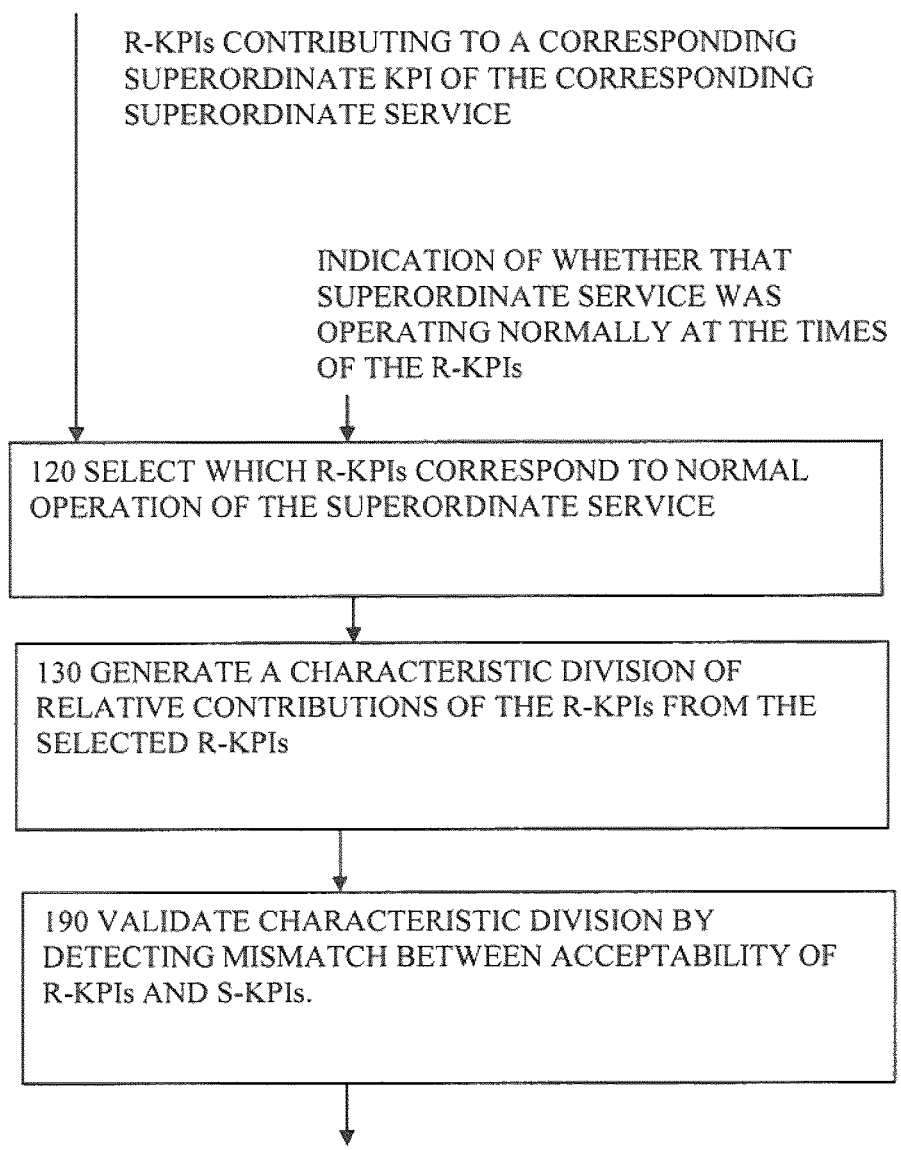
FIGS. 17 and 18 show steps in embodiments having budget validation.
Figure 18:
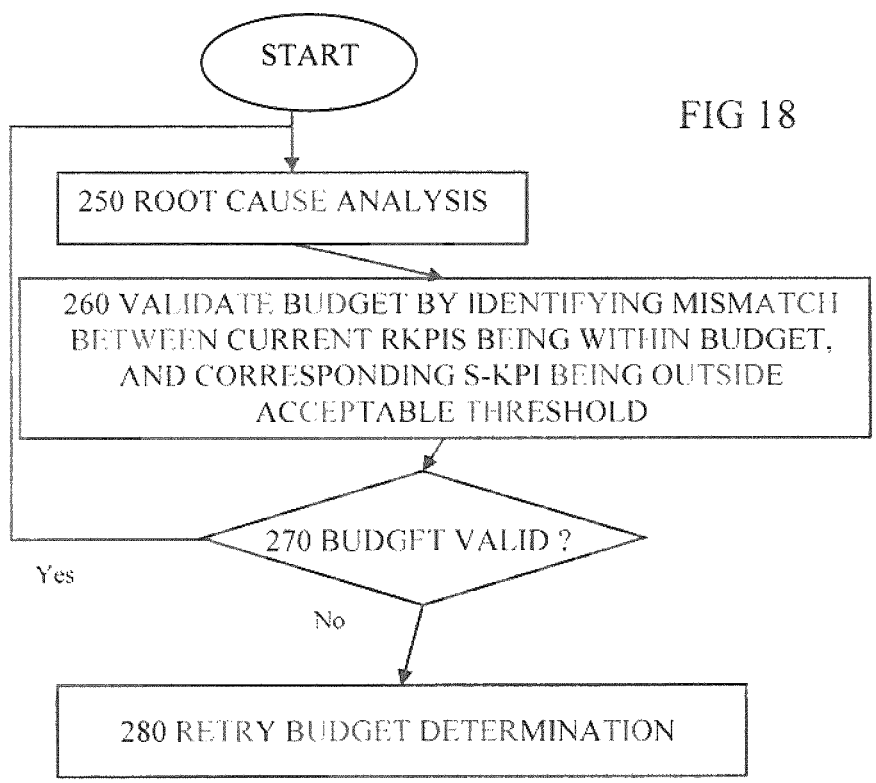

FIGS. 17, 18 Budget Validation

Inaccurate budgets may lead to wrong results in RCA. On the other hand, performance characteristics of services may evolve over time as discussed above, due to increases in load and to network reconfiguration for example. Budget validation is typically a feedback-loop process of budget determination. The aim is to validate the budgets used in the RCA process. If it is identified that the budget(s) used is not valid any more, the validation process would trigger the budget determination process to get it updated.

The budget validation can be carried out separately, or along with the root case analysis. For example, after each RCA operation, budgets used may be validated accordingly. FIG. 17 shows steps of an embodiment in which generating the characteristic division of the service is followed by validation. Steps 120 and 130 are as described with reference to FIG. 4, and are followed by step 190 of validating by detecting a mismatch between acceptability of the service, for example in terms of its S-KPIs, and acceptability of the contributory services on which the superordinate service depends, in terms of their R-KPIs for example. Possible implementations of this step will now be described in more detail.

FIG. 18 shows a flow chart for a budget validation process. The budget validation process assesses if the calculated budget is valid. The validation is checked by verification of the contributory service or ReSe budget status with the SySe breach status, according to Table 2.

TABLE 2

| Possible logical combinations | | |
|---|---|---|
| | SySe breached | SySe not breached |
| R-KPI in budget | Invalid budget | Valid budget |
| R-KPI not in budget | Valid budget | Invalid budget |

The validation applies to each instance of SySe, with dependent ReSe's and each performance parameter. The assessment if budget is valid or invalid is determined by the significance testing described below.

R-KPI Breach Distribution

It is expected in most cases as shown in table 2 that when S-KPIs of a system service or R-KPIs of a contributory service are out of budgets, or breaching thresholds, at least some lower level R-KPIs of at least some dependent resource services shall be out of budget. Also, when KPIs of a lower level resource service are within budgets, or under thresholds, KPIs of higher level services depending on these lower level services should be within their budgets.

However, the above hypothesis may not always hold due to the following reasons. There may be propagation delays of failures. Non-breaching of system service KPIs does not always indicate that the resource service KPIs are still in budget; and vice versa. Also, budgets may be inaccurate, most likely due to changes in the network characteristics.

In these cases, the KPI status between contributory services and superordinate system and resource services would be mismatched. Bearing these considerations in mind, there is a step of validating budgets of each contributory service or each superordinate service, by evaluating significance of occurrences of KPI status mismatches as discussed above in relation to table 2. The purpose of the significance tests is two-fold, to identify inaccurate budgets, and to remove those noisy cases in which mismatches are caused by propagation delay of failures (when budgets are still accurate).

Significance Tests

A result is regarded as statistically significant if it is unlikely to have occurred by chance. If a budget of a service is inaccurate, the occurrences of mismatches of KPI status should be statistically significant.

Suppose that in the operational network, there are n system service sessions. R-KPIs (of each service) are measured for each session. Budgets of each service are used for RCA.

For a budget being studied, let $x_i$ (i=1, 2, . . . n) be the variable describing whether or not there is a mismatch between the system service session KPI status and the contributory service i KPI status.

$x_i$=1 if session i observes mismatch in terms of KPI status with its dependent services;

$x_i$=0 if no mismatch is observed.

Obviously, $x_1 \ldots x_n$ are independent. The values of $x_1 \ldots x_n$ can be obtained from multiple sessions of the same service. The mean μ and population variance $\sigma^2$ for $x_i$ can be approximated respectively using the following equations:

$$\mu = \frac{1}{n}\sum_{i=1}^{n} x_i$$

$$\sigma^2 = \frac{1}{n-1}\sum_{i=1}^{n} (x_i - \mu)^2$$

Consider a particular budget is associated with m sessions (i.e. m sessions running through a particular service), which have a total of k mismatches. Now it is useful to determine whether the budget being studied has significant mismatches, e.g. to test whether k is significant.

Under the null hypothesis that the m sessions are drawn independently and uniformly at random from n sessions, $$k = \sum_{i=1}^{m} x_i$$

$$E[k] = m * \mu$$

$$\text{Var}[k] = m * \sigma^2$$

In a large operational network, service sessions over the observation window (for example, one week) are reasonably large (>>30). So k is well-approximated by a normal distribution. Therefore, k is considered significant if $$z = \frac{\frac{k}{m} - \mu}{\frac{\sigma}{\sqrt{m}}} \geq z_0,$$

where $z_0$ is the threshold.

For standard normal distribution, using values of $z_0$ as 1.64 and 1.96 provides confidence levels of 95% and 97.5%.

Based on such statistical significance tests, the budgets are validated against RCA process, and inaccurate budgets are therefore identified.

Note that this validates budgets using statistical significance tests. However, other approaches using other methods for budget validation can be envisaged.

Figure 19:
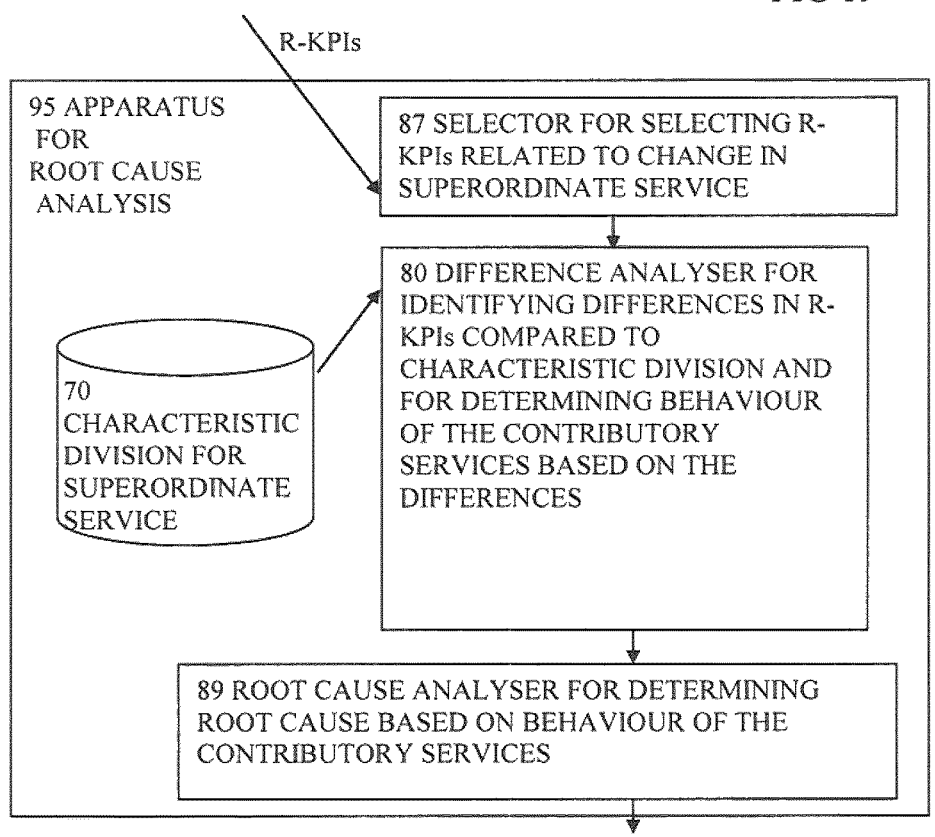
FIG. 19 shows an embodiment of apparatus for root cause analysis.

FIG. 19, Embodiment of Apparatus for Root Cause Analysis

FIG. 19 shows a schematic view of apparatus 95 for root cause analysis of a change in behavior of a service, for use in some embodiments. Some features are similar to those of FIG. 6, and the apparatus corresponds to the method steps of FIG. 10 or 11 described above. Again this apparatus can be implemented as a function within a network management system, or separately from the network managements system for example. The apparatus has a selector 87 for selecting R-KPIs related to the change in service behavior. This provides the selected R-KPIs to the difference analyzer 80 either in real time, or as stored representations of past events for example. The difference analyzer 80 is configured to identify differences between the received R-KPIs and the characteristic division, received in this case from a store 70. The differences are used by the analyzer for determining behaviour of the contributory services used for the superordinate service. A root cause analyzer 89 is coupled to receive an indication of the behavior, and which contributory services are showing such behavior, and to determine the root cause accordingly.

Figure 20:
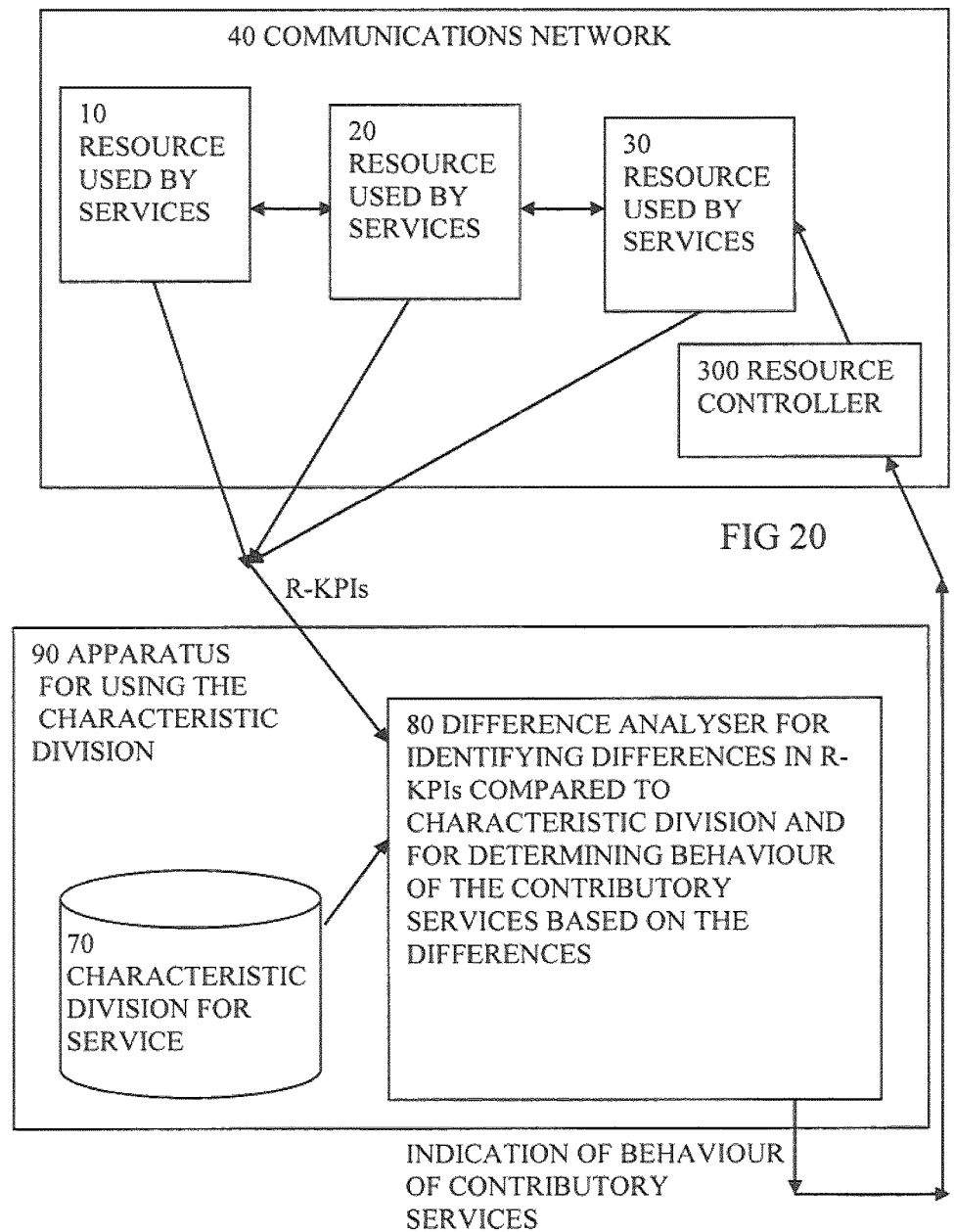
FIG. 20 shows a schematic view of apparatus similar to the view of FIG. 7 with a feedback path for using the detected anomalous behaviour in managing the resources.

FIG. 20, Use in Managing Resources

FIG. 20 shows a schematic view of apparatus similar to the view of FIG. 7 described above, though with the addition of a feedback path for the results of determining the behaviour of the contributory services. This is fed back to a resource controller 300 which is coupled to one or more of the resources of the network, to enable management of the respective services according to the determined behaviour. This could be useful to reroute traffic or reallocate resources to reduce bottlenecks for example.

Figure 21:
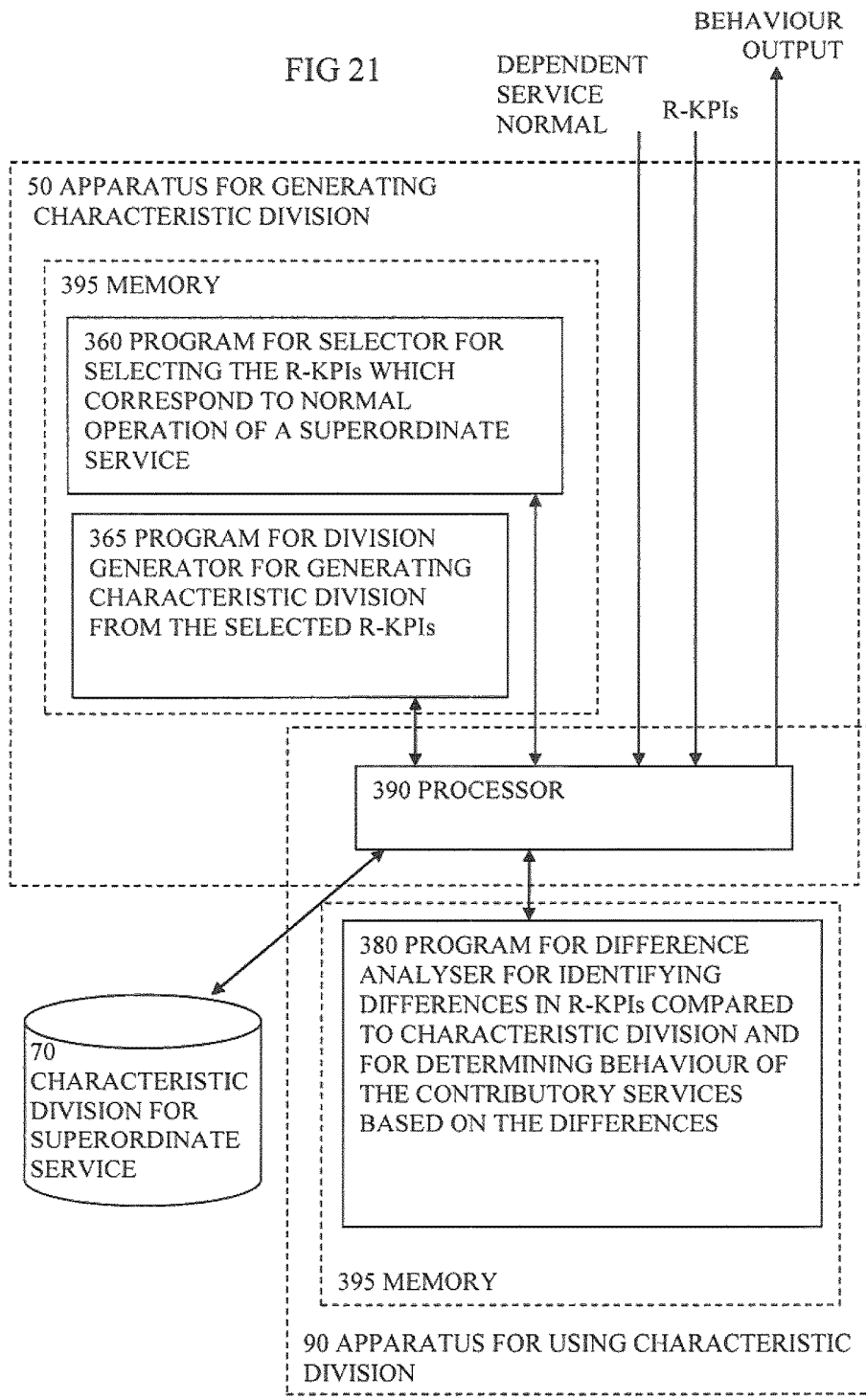
FIG. 21 shows an embodiment having program modules.

FIG. 21 Embodiment Having Programs

FIG. 21 shows an embodiment having apparatus 50 for generating the characteristic division and apparatus 90 for using the characteristic division to determine behaviour of the contributing services, implemented in this case by programs for execution by a processor 390. A memory 395 has stored program 360 for the selector for selecting the R-KPIs which correspond to the normal operation of a superordinate service. The memory also has a program 365 for the division generator for generating the characteristic division from the selected R-KPIs, as described above. The memory is coupled to a processor 390 to enable the processor to execute the programs. The processor has an input to receive the indication of the superordinate service being normal, and is coupled to the store 70 to store the resulting characteristic division for the superordinate service.

The apparatus 90 for using the characteristic division has memory 395 for storing a program 380 for the difference analyser for identifying the differences in R-KPIs compared to the characteristic division, and determining behaviour of the contributory services. The apparatus for using the characteristic division also encompasses the processor 390 which is coupled to the memory to enable the processor to execute the program and output the resulting behaviour information, which can be further processed or used in various applications.

In various embodiments of the present invention the apparatus comprises a processor 390 and a memory 395, wherein at least one of the selector, division generator, difference analyzer, root cause analyzer or service controller is implemented in software operating in the processor 390 based on instructions stored in the memory 395.

Figure 22:
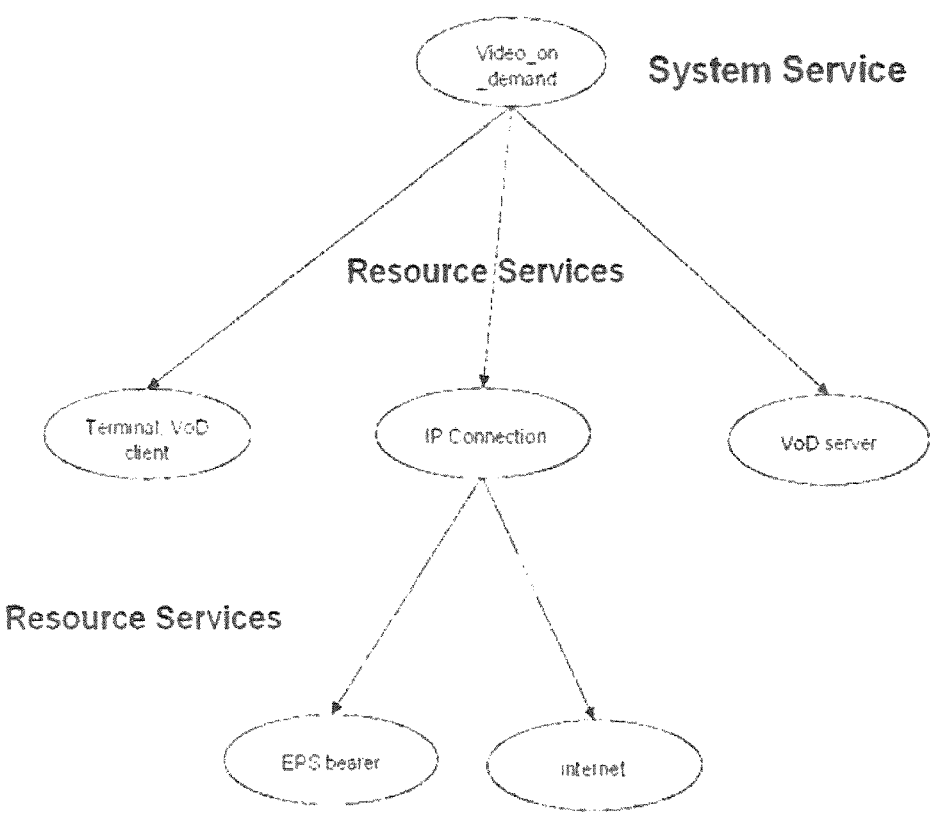
FIG. 22 shows a hierarchy of resource services relating to a Video on demand service example.

FIG. 22 Video on Demand Service Example

FIG. 22 shows a schematic view of a VOD service and contributory services on which it depends, in the form of resource services such as a VOD client on the users terminal, an IP connection, and a VOD server. The IP connection relies on lower level resources such as an EPS bearer and internet infrastructure. A service provider offers this Video_on_demand service to the end-users. The performance of Video_on_Demand is described with S-KPI's for accessibility, retainability and integrity. One of the integrity performance metrics is Video-on-Demand Access Time.

The parameter Video on Demand Access Time describes the duration (in seconds) from request of service (e.g. pushing the button on the handset) until the default media stream is presented on the screen. In this case the resources used are the VoD client on the terminal, the EPS bearer in the mobile network, IP connection in the internet and the VoD server at the content provider. The total access time is the sum of the delays caused by each resource service.

Video on Demand Integrity Access Time=$2*d\_vodclient+ 2*d\_epsbearer+2*d\_internet+2*d\_vodserver$ (d is the one-way latency resource KPI of each contributory service)

The end-user has expectations for example that the access time will not exceed 5 seconds, so the S-KPI threshold is set to 5 seconds. The S-KPI is breached when the access time is higher than 5 seconds independent of the distribution of the delay time over the resource service. However when the cause of the breach needs to be found the RCA is needed to identify the contributory service or its corresponding resource that is the cause of the breach. Therefore, it is necessary to determine the one-way budget for each resource. The following paragraphs show how the budgets are automatically determined and validated.

Budget Determination

Measurements of the VOD Access Time s-KPI and the corresponding R-KPIs (i.e. the one-way latencies mentioned above) are continuously collected for each session. Along with the S-KPI-S, R-KPIs are also collected and associated with which system service instance it took part to realize. R-KPIs belonging to VOD sessions with less than 5 seconds VOD Access Time are used to calculate the preliminary delay budget, using the method described above in relation to FIG. 16, for preliminary budget determination. The preliminary budgets are calculated for each VOD session.

The R-KPI delay value combination variations of all sessions that pass the S-KPI criteria are selected and used to create the characteristic division of contributions, referred to as the budget.

Across all of the VOD sessions, the determined preliminary budgets of the resources (for EPS bearer resource, for example) are evaluated using the convergence evaluation method described above in relation to FIG. 16, to check if the budgets for different sessions converge to a fixed value. If converged, the budgets are made available for root cause analysis; if diverged, the determined budgets are disposed, and the algorithm goes back to restart the calculation of preliminary budgets.

The budgets that are made available for RCA can be validated to make sure the budgets reflect real-time or near-real-time network (resource) conditions. If all latency budgets of the VOD Access Time are valid, this means firstly that when all of the resource services are in budget, the threshold of the VOD Access Time should NOT be breached; otherwise it is considered as a mismatch. Secondly, when the threshold of the VOD Access Time is breached, there should be at least one contributory service whose latency is NOT in budget; otherwise it is considered as a mismatch.

Using the validation methods described above in relation to FIG. 18, the occurrences of mismatches (described in Table 2) are counted and the significance of such mismatches is evaluated. If significant mismatches occur with the budget of a resource, the budget of the resource should not be used for RCA and recalculation should start.

Embodiments can provide automatic determination and updating of allowed performance budgets of R-KPIs of contributory services for normal operation of the corresponding superordinate service, that is while a system service performance threshold is not breached. Higher granularity of budgeting can be achieved, which allows further optimization of the use of network resources. Improved accuracy of budgets in some embodiments can be enabled through convergence analysis and continuous validations on determined budgets. There can be a relatively low computation cost in deployment without introducing significant impact on the performance of existing systems, which makes it suitable for very large scale networks. Embodiments can make use of industry proven statistical approaches, and thus reduce development risks. The proposed method is applicable to additive resource R-KPIs (such as delays, errors and losses, (to which the budget concept can be applied). Some of the benefits also apply to non-additive resource service KPIs, which can be determined (and validated) in the same way as those for additive KPIs. Their preliminary budgets can be determined using measurement samples from the resource, and then checking the convergence before making the budgets available for RCA, though the use of the characteristic division relies on there being at least some additive effect in the nature of the R-KPIs.

Many other variations can be envisaged within the claims.

REFERENCES

[1] Ericsson White Paper 284 23-3150 Uen "Keeping the Customer Service Experience Promise", January 2011
[2] G. Holm-Oste and M. Norling. Ericsson's User Service Performance Framework. *Ericsson Review*, (1):43-46, 2008
[3] WO/2008/121062, Method and Apparatus for Evaluating Services in Communication Networks
[4] WO2013044974 Method, Apparatus and communication network for Automated Service Root Cause Analysis
[5] Automated and Adaptive Threshold Setting: Enabling Technology for Autonomy and Self-Management. http://www.netlab.tkk.fi/opetus/s384030/k06/papers/AutomatedAndAdaptiveThresholdSetting.pdf
[6] U.S. Pat. No. 5,751,964 System and method for automatic determination of thresholds in network management.

The following is an example identifying a particular embodiment of the techniques disclosed above. The present disclosure is not limited to the following embodiment as the following embodiment is only an example.

Example

A method of analyzing behavior of services provided by resources of a communications network, some of the services being superordinate services which depend on contributory ones of the services, the resources providing resource key performance indicators, R-KPIs, of the contributory services, based on measurements from the resources used, the R-KPIs contributing to a key performance indicator KPI for the corresponding superordinate service, the method having the steps of:
identifying differences between the R-KPIs and a characteristic division of relative contributions of the R-KPIs to the KPI of the corresponding superordinate service, the characteristic division being determined from selected ones of the R-KPIs corresponding to times that the superordinate service was operating normally, and
determining behavior of the contributory services relating to these R-KPIs based on the identified differences.

The invention claimed is:

1. A method of monitoring a communications network having resources used to provide services, some of which are superordinate services which depend on contributory ones of the services, the method comprising:
selecting from a plurality of resource key performance indicators, R-KPIs, obtained from measurements from the resources, the R-KPIs being of contributory services contributing to a key performance indicator, KPI, of a corresponding superordinate service, wherein selecting is based on indications of whether the superordinate service was operating normally at times related to received R-KPIs, so as to select those of the received R-KPIs which correspond to a normal operation of the superordinate service;
generating automatically from the selected R-KPIs a characteristic division of relative contributions of the R-KPIs to the KPI of the corresponding superordinate service for the times that the service was operating normally; and
validating the generated characteristic division by identifying a mismatch between a first state of whether current R-KPIs are individually acceptable and a second state of whether a current KPI of the corresponding superordinate service is acceptable.

2. The method of claim 1, further comprising identifying differences between at least R-KPIs other than those selected, and the characteristic division, and determining behavior of the contributory services relating to these R-KPIs based on the identified differences.

3. The method of claim 2, further comprising managing the network by managing at least one of the contributory services, based on the identified differences.

4. The method of claim 2, for use in a root cause analysis of a change in behavior of the superordinate service, and wherein identifying the differences is carried out for R-KPIs related to the change in behavior of the superordinate service and comprises determining the root cause based on the determined behavior of the contributory services related to these R-KPIs.

5. The method of claim 4, further comprising identifying which of the R-KPIs are associated with a time of the change, and selecting these associated R-KPIs for identifying the differences.

6. The method of claim 1, wherein selecting those of the received R-KPIs which correspond to the normal operation of the superordinate service comprises determining a correspondence between at least one of the received R-KPIs and the times of normal operation based on an expected delay in how the respective contributory service affects the superordinate service.

7. The method of claim 1, further comprising determining whether values of the KPI of the corresponding superordinate service, obtained from measurements of the superordinate service, are acceptable, to indicate whether the superordinate service was operating normally.

8. The method of claim 1, further comprising:
evaluating convergence of the characteristic division, by generating a sequence of candidate characteristic divisions for different time periods, and
evaluating how much the sequence of candidate characteristic divisions converges towards an optimal candidate division.

9. The method of claim 1, wherein the R-KPIs comprise at least one of: delays, latency, loss ratio, noise, bit errors, packet errors, packet losses, frame errors, frame losses, amount of variation of any of these.

10. An apparatus for monitoring a communications network, the communications network comprising resources for use in providing services, some of the services being superordinate services which depend on contributory ones of the services, the apparatus comprising:
a selector configured to select from a plurality of resource key performance indicators, R-KPIs, obtained from measurements from the resources, of contributory services contributing to a key performance indicator, KPI, of a corresponding superordinate service, wherein selecting is based on an indication of whether the superordinate service was operating normally at the time, so as to select R-KPIs which correspond to a normal operation of the superordinate service, and
a division generator configured to generate from the selected R-KPIs a characteristic division of relative contributions of the R-KPIs to the KPI of the corresponding superordinate service for the times that the superordinate service was operating normally;
wherein the apparatus is configured to validate the generated characteristic division by identifying a mismatch between a first state of whether current R-KPIs are individually acceptable and a second state of whether a current KPI of the corresponding superordinate service is acceptable.

11. The apparatus of claim 10, further comprising a difference analyser configured to identify differences between R-KPIs other than those selected, and the characteristic division, and configured to determine behavior of the contributory services based on the identified differences.

12. The apparatus of claim 11, configured for root cause analysis of a change in behavior of the superordinate service, by having the selector configured to select R-KPIs related to the change in behavior of the superordinate service for input to the difference analyser, and further comprising a root cause analyser configured to receive an indication of the determined behavior of the contributory services related to these R-KPIs, and to determine a root cause based on this indication.

13. The apparatus of claim 12 wherein the selector for selecting R-KPIs related to the change in behavior is also configured to identify which of the R-KPIs are associated with a time of the change, and to select these associated R-KPIs for use in identifying the differences.

14. The apparatus of claim 11, further comprising service controller configured to manage at least one of the contributory services, based on the identified differences.

15. The apparatus according to claim 10, further comprising a processor and a memory, wherein at least one of the selector, division generator, difference analyzer, root cause analyzer or service controller is implemented in software operating in the processor based on instructions stored in the memory.

16. A communication network comprising resources for use by services, and having an apparatus monitoring a communications network, the communications network comprising resources for use in providing services, some of the services being superordinate services which depend on contributory ones of the services, the apparatus comprising:
- a selector configured to select from a plurality of resource key performance indicators, R-KPIs, obtained from measurements from the resources, of contributory services contributing to a key performance indicator, KPI, of a corresponding superordinate service, wherein selecting is based on an indication of whether the superordinate service was operating normally at the time, so as to select R-KPIs which correspond to a normal operation of the superordinate service, and
- a division generator configured to generate from the selected R-KPIs a characteristic division of relative contributions of the R-KPIs to the KPI of the corresponding superordinate service for the times that the superordinate service was operating normally;

wherein the apparatus is configured to validate the generated characteristic division by identifying a mismatch between a first state of whether current R-KPIs are individually acceptable and a second state of whether a current KPI of the corresponding superordinate service is acceptable.

* * * * *